(12) United States Patent
Joseph et al.

(10) Patent No.: US 11,606,717 B2
(45) Date of Patent: Mar. 14, 2023

(54) ETHERNET HEADER COMPRESSION TECHNIQUES IN NEW RADIO

(71) Applicant: QUALCOMM Incorporated, San Diego, CA (US)

(72) Inventors: Vinay Joseph, Calicut (IN); Sitaramanjaneyulu Kanamarlapudi, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/065,890

(22) Filed: Oct. 8, 2020

(65) Prior Publication Data

US 2021/0112449 A1 Apr. 15, 2021

Related U.S. Application Data

(60) Provisional application No. 62/914,239, filed on Oct. 11, 2019.

(51) Int. Cl.
*H04W 28/06* (2009.01)
*H04L 69/04* (2022.01)
*H04L 1/1812* (2023.01)

(52) U.S. Cl.
CPC ........... *H04W 28/06* (2013.01); *H04L 1/1812* (2013.01); *H04L 69/04* (2013.01)

(58) Field of Classification Search
CPC ......... H04L 1/1812; H04L 69/04; H04L 1/08; H04W 28/06
See application file for complete search history.

(56) References Cited

U.S. PATENT DOCUMENTS

| 2005/0008037 A1* | 1/2005 | Koren | H04L 69/04 370/474 |
| 2008/0025312 A1* | 1/2008 | Kuppuswamy | H04W 28/06 370/392 |

(Continued)

OTHER PUBLICATIONS

Qualcomm Incorporated: "Principles for Ethernet Header Compression", 3GPP Draft, R2-1910764 TSG-RAN WG2 Meeting #107, Aug. 16, 2019 (Aug. 16, 2019). (Year: 2019).*

(Continued)

*Primary Examiner* — Mandish K Randhawa
(74) *Attorney, Agent, or Firm* — Arent Fox LLP

(57) ABSTRACT

The disclosure includes a method at a device configured to process both wireless data traffic and Ethernet data traffic into a wireless communication, comprising determining, at a compressor, whether an acknowledgement (ACK) signal is received from a decompressor in response to transmitting, over a wireless communication link, a context creation message for a context identification (ID) associated with a flow of incoming Ethernet data traffic; refraining from transmitting, by the compressor to the decompressor over the wireless communication link, a compressed packet corresponding to the flow based on a first determination that the ACK signal is not received from the decompressor; and transmitting, by the compressor to the decompressor over the wireless communication link, the compressed packet corresponding to the flow based on a second determination that the ACK signal is received from the decompressor.

28 Claims, 15 Drawing Sheets

(56) References Cited

U.S. PATENT DOCUMENTS

2012/0106344 A1* 5/2012 Chrysos ................. H04L 69/28
                                                              370/236
2020/0022022 A1* 1/2020 Ly ........................... H04L 69/04
2020/0314690 A1* 10/2020 Kim ....................... H04L 69/22

OTHER PUBLICATIONS

Anonymous: "Retransmission (Data Networks)—Wikipedia", Apr. 14, 2018 (Apr. 14, 2018), XP055758359, pp. 1-2, Retrieved from the Internet: URL:https://en.wikipedia.org/w/index.php?title=Retransmission_(data_networks)&oldid=836376343 [retrieved on Dec. 9, 2020].

Catt: "Discussion on Ethernet Header Compression", 3GPP Draft, R2-1908825, 3GPP TSG-RAN WG2 Meeting #107, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051766647, 5 Pages, Retrieved from the Internet: URL:http://www.3gpp.org/ftp/tsg_ran/WG2_RL2/TSGR2_107/Docs/R2-1908825.zip [retrieved on Aug. 16, 2019] pp. 1-4.

International Search Report and Written Opinion—PCT/US2020/055080—ISA/EPO—dated Jan. 22, 2021.

* cited by examiner

1105 — PDCP Hdr D/C set to "C" | PDU Type=Ethernet Compression Config CID Value=X, Subtype=SetupAck 1110 — PDCP Hdr D/C set to "C" | PDU Type=Ethernet Compression Config CID Value=X, Subtype=Delete 1115 — PDCP Hdr D/C set to "C" | PDU Type=Ethernet Compression Config CID Value=X, Subtype=DeleteAck

FIG. 11

ETHERNET HEADER COMPRESSION TECHNIQUES IN NEW RADIO

CROSS-REFERENCE TO RELATED APPLICATION(S)

The present application claims benefit of U.S. Provisional Application No. 62/914,239 entitled "ETHERNET HEADER COMPRESSION TECHNIQUES IN NEW RADIO" filed Oct. 11, 2019, and is assigned to the assignee hereof and hereby expressly incorporated by reference herein.

FIELD OF THE DISCLOSURE

Aspects of the present disclosure generally relate to wireless communication, and more particularly to techniques and apparatuses for Ethernet header techniques in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of communication, performed by a transmitter, may include determining to modify a context identifier, the context identifier corresponding to Ethernet packet header values, and transmitting a context delete message to a receiver identifying the context identifier.

In some aspects, a method at a device configured to process both wireless data traffic and Ethernet data traffic into a wireless communication, includes determining, at a compressor, whether an acknowledgement (ACK) signal is received from a decompressor in response to transmitting, over a wireless communication link, a context creation message for a context identification (ID) associated with a flow of incoming Ethernet data traffic; refraining from transmitting, by the compressor to the decompressor over the wireless communication link, a compressed packet corresponding to the flow based on a first determination that the ACK signal is not received from the decompressor; and transmitting, by the compressor to the decompressor over the wireless communication link, the compressed packet corresponding to the flow based on a second determination that the ACK signal is received from the decompressor.

In some aspects, a transmitter or receiver configured to process both wireless data traffic and Ethernet data traffic into a wireless communication may include memory and one or more processors coupled to the memory. The memory and the one or more processors may be configured to determine, at a compressor, whether an ACK signal is received from a decompressor in response to transmitting, over a wireless communication link, a context creation message for a context ID associated with a flow of incoming Ethernet data traffic; refrain from transmitting, by the compressor to the decompressor over the wireless communication link, a compressed packet corresponding to the flow based on a first determination that the ACK signal is not received from the decompressor; and transmit, by the compressor to the decompressor over the wireless communication link, the compressed packet corresponding to the flow based on a second determination that the ACK signal is received from the decompressor.

In some aspects, a non-transitory computer-readable medium may store one or more instructions for communication. The one or more instructions, when executed by one or more processors of a transmitter or receiver, may cause the one or more processors to determine, at a compressor, whether an ACK signal is received from a decompressor in response to transmitting, over a wireless communication link, a context creation message for a context ID associated with a flow of incoming Ethernet data traffic; refrain from transmitting, by the compressor to the decompressor over the wireless communication link, a compressed packet corresponding to the flow based on a first determination that the ACK signal is not received from the decompressor; and transmit, by the compressor to the decompressor over the wireless communication link, the compressed packet corresponding to the flow based on a second determination that the ACK signal is received from the decompressor.

In some aspects, an apparatus for communication may include means for determining, at a compressor, whether an ACK signal is received from a decompressor in response to transmitting, over a wireless communication link, a context creation message for a context ID associated with a flow of incoming Ethernet data traffic; means for refraining from transmitting, by the compressor to the decompressor over the wireless communication link, a compressed packet corresponding to the flow based on a first determination that the ACK signal is not received from the decompressor; and means for transmitting, by the compressor to the decompressor over the wireless communication link, the compressed packet corresponding to the flow based on a second determination that the ACK signal is received from the decompressor.

Additionally disclosed is a method at a device configured to process a wireless communication of both wireless data traffic and Ethernet data traffic, includes receiving, by a decompressor from a compressor and over a wireless communication link, one or more compressed packets associated with a context identification (ID) corresponding to a flow of incoming Ethernet data traffic; determining, by a decompressor, whether a context creation message associated with the context ID is received from the compressor; and discarding, by the decompressor, the one or more compressed packets based on a determination that the context creation message associated with the context ID is not received from the compressor.

In some aspects, a transmitter or receiver for communication may include memory and one or more processors coupled to the memory. The memory and the one or more processors may be configured to receive, by a decompressor from a compressor and over a wireless communication link, one or more compressed packets associated with a ID corresponding to a flow of incoming Ethernet data traffic; determine, by a decompressor, whether a context creation message associated with the context ID is received from the compressor; and discard, by the decompressor, the one or more compressed packets based on a determination that the context creation message associated with the context ID is not received from the compressor.

In some aspects, a non-transitory computer-readable medium may store one or more instructions for communication. The one or more instructions, when executed by one or more processors of a transmitter or receiver, may cause the one or more processors to receive, by a decompressor from a compressor and over a wireless communication link, one or more compressed packets associated with a ID corresponding to a flow of incoming Ethernet data traffic; determine, by a decompressor, whether a context creation message associated with the context ID is received from the compressor; and discard, by the decompressor, the one or more compressed packets based on a determination that the context creation message associated with the context ID is not received from the compressor.

In some aspects, an apparatus for communication may include means for receiving, by a decompressor from a compressor and over a wireless communication link, one or more compressed packets associated with a ID corresponding to a flow of incoming Ethernet data traffic; means for determining, by a decompressor, whether a context creation message associated with the context ID is received from the compressor; and means for discarding, by the decompressor, the one or more compressed packets based on a determination that the context creation message associated with the context ID is not received from the compressor.

Aspects generally include a method, apparatus, system, computer program product, non-transitory computer-readable medium, user equipment, base station, wireless communication device, and processing system as substantially described herein with reference to and as illustrated by the accompanying drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-15 are diagrams illustrating example processes relating to Ethernet header compression state management and other Ethernet header compression techniques in New Radio, in accordance with various aspects of the present disclosure.

DETAILED DESCRIPTION

Figure 1:
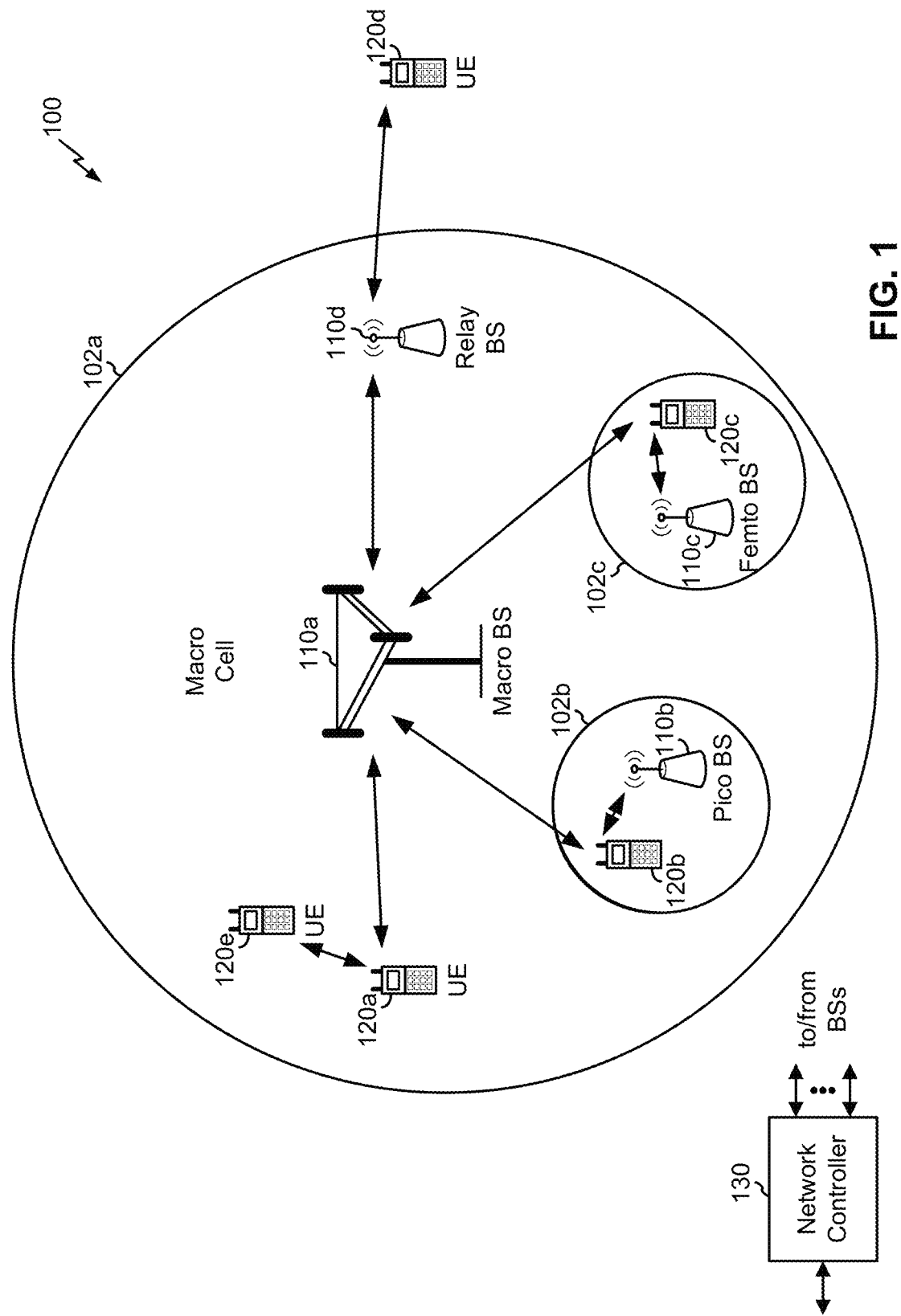
FIG. 1 is a block diagram conceptually illustrating an example of a wireless communication network, in accordance with various aspects of the present disclosure.

The present disclosure relates generally to a wireless communication device that is configured to process both wireless data packets and Ethernet data packets, and communicate such packets over a wireless communication link. Typical wireless communication protocols, and/or packet compression protocols, may not be suitable to process Ethernet data packet flows for wireless communication in New Radio to meet low latency, high reliability, and low processing resource utilization requirements of the typically high volume and high quality of service Ethernet data packet flows. The wireless communication device of the present disclosure may be configured to overcome one or more of these deficiencies.

In some aspects, unlike regular header compression algorithms (e.g., IP), Ethernet header compression used in a wireless node (e.g., UE or base-station) has several unique characteristics and requirements. Ethernet header compression may be used for traffic (e.g., factory automation traffic requiring high reliability) carried over wireless links that is averse to packet loss (e.g., due to unavailable context) and packet error (e.g., due to stale context), and hence robustness of Ethernet header compression is important. Further, Ethernet header compression has to be simple (e.g., without requiring complex operations on each packet) so that all processing related to compression/decompression can be performed quickly while satisfying Ultra-reliable low latency communication (URLLC) timelines of some of the traffic types carried over wireless links. Ethernet header compression in a wireless node communication over wireless links should also account for retransmissions and reordering caused by wireless transmissions and allows for control of configuration of the compressor and decompressor in a UE by a wireless network node (e.g., gNB) based on the configuration (e.g., the number of hybrid automatic repeat requests (HARQ)/radio link control (RLC) retransmissions used) and channel conditions observed by the wireless network node.

In an aspect, the present disclosure relates to Ethernet header compression in New Radio, and more particularly to managing changes in a context identifier of a context associated with one or more flows of compressed Ethernet packets. As used herein, the context identifier identifies a set of Ethernet header fields, and a corresponding set of respective field values, associated with a compressed Ethernet packet. In an implementation, a transmitter performing the Ethernet header compression may determine to modify a context identifier, e.g. to modify the set of Ethernet packet headers and/or the corresponding values; and in response transmits a context delete message to a receiver identifying the context identifier to be modified. In response to the context delete message, the receiver, which operates to decompress the compressed Ethernet packets, may then clear a stored mapping between the context identifier and the set of Ethernet packet headers and the corresponding values. This procedure enables the transmitter to re-use the content identifier with a modified set of Ethernet packet headers and/or the corresponding values for compressing a new flow of Ethernet packets. Thus, the present disclosure enables simple and efficient management of the context used for Ethernet header compression. These and other details of the present disclosure are discussed below in more detail.

In further aspects, the present disclosure relates to a device configured to process both wireless data traffic and Ethernet data traffic into a wireless communication. For example, the aspects include determining, at a compressor, whether an acknowledgement (ACK) signal is received from a decompressor in response to transmitting, over a wireless communication link, a context creation message for a context identification (ID) associated with a flow of incoming Ethernet data traffic. Further, the aspects include refraining from transmitting, by the compressor to the decompressor over the wireless communication link, a compressed packet corresponding to the flow based on a first determination that the ACK signal is not received from the decompressor. Further, the aspects include transmitting, by the compressor to the decompressor over the wireless communication link, the compressed packet corresponding to the flow based on a second determination that the ACK signal is received from the decompressor.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the Ethernet header compression technique described in the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. The network controller 130 may include, for example, a device that provides a user plane function (UPF), a device that provides an access management function (AMF), a device that provides a session management function (SMF) device, a mobility management entity (MME), a serving gateway (SGW), a packet data network (PDN) gateway (PGW), and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an Ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
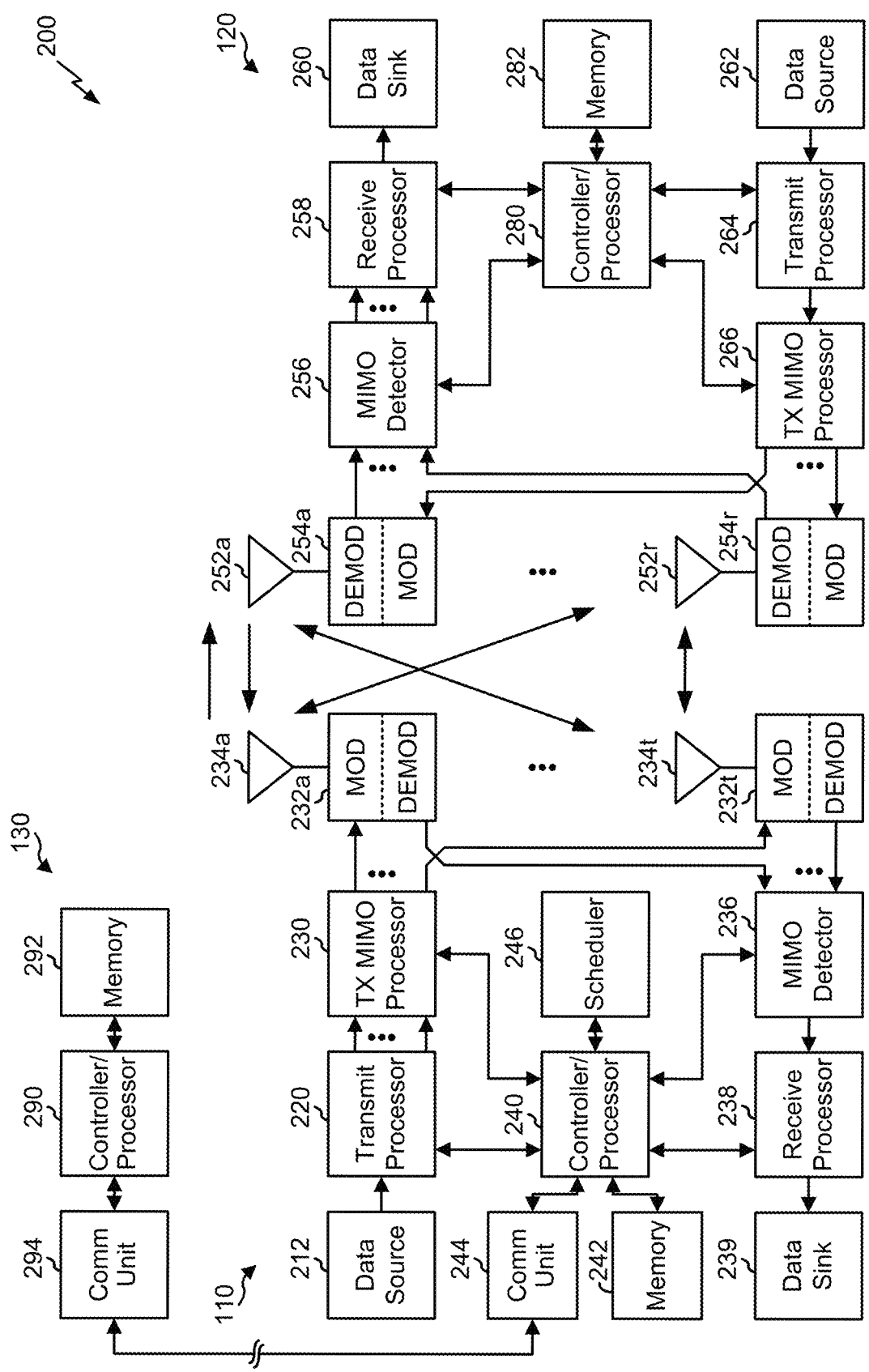
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1, and each of which may be or may include a transmitting device or compressor device, and/or a receiving device and/or decompressor device configured for performing the Ethernet header compression/decompression techniques discussed herein. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by demodulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, and/or any other component(s) of FIG. 2 may perform one or more techniques associated with Ethernet header compression in New Radio, as described in more detail elsewhere herein. For example, controller/processor 240 of base station 110, controller/processor 280 of UE 120, controller/processor 290 of network controller 130, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242, 282, and 292 may store data and program codes for base station 110, UE 120, and network controller 130, respectively. A scheduler 246 may schedule UEs for data transmission on the downlink and/or uplink.

In some aspects, a transmitter (e.g., a base station 110, a UE 120, a network controller 130, and/or the like) may include means for; and/or the like.

Additionally, or alternatively, a receiver (e.g., a base station 110, a UE 120, a network controller 130, and/or the like) may include means for; and/or the like.

In some aspects, such means may include one or more components of base station 110, UE 120, and/or network controller 130 described in connection with FIG. 2.

As indicated above, FIG. 2 is provided merely as an example. Other examples are possible and may differ from what was described with regard to FIG. 2.

In New Radio and other types of radio access technologies, Ethernet frames carrying one or more Ethernet data packet flows may be transported over a wireless wide area network (WWAN), such as a cellular network, a 5G network, and/or the like. For example, a packet data network (PDN) and corresponding protocols have been defined for transporting Ethernet traffic over 5G, sometimes referred to as Ethernet over packet data convergence protocol (PDCP). In some cases, a header for an Ethernet frame (e.g., an Ethernet header) may contribute significant overhead to the overall size of a packet that includes the Ethernet frame. For example, an Ethernet header may be 14 bytes, 18 bytes, 22 bytes, or more. In some scenarios, such as factory automation, the overall size of transported packets may be small, such as between 20 bytes and 50 bytes. In these cases, when an Ethernet header is included in each packet, the Ethernet header may significantly increase the size of the packet (e.g., a 28% increase or more, including up to a 110% increase or more). Some techniques and apparatuses described herein significantly reduce the amount of overhead created by Ethernet headers transported over a 5G network or a similar type of network, such as by removing the Ethernet headers when certain conditions are satisfied.

Furthermore, overhead caused by transporting Ethernet headers requires network resources (e.g., time resources, frequency resources, spatial resources, resource elements, and/or the like) that could otherwise be used to transport other network traffic. In scenarios with a low latency requirement and/or a high reliability requirement (e.g., factory automation, ultra reliable low latency communications (URLLC), and/or the like), transporting Ethernet headers over a 5G network or a similar type of network may reduce the likelihood that network traffic delivery satisfies such requirements. Accordingly, some techniques and apparatuses described herein conserve network resources and assist with satisfying latency requirements, reliability requirements, and/or the like by reducing Ethernet header overhead.

Figure 3:
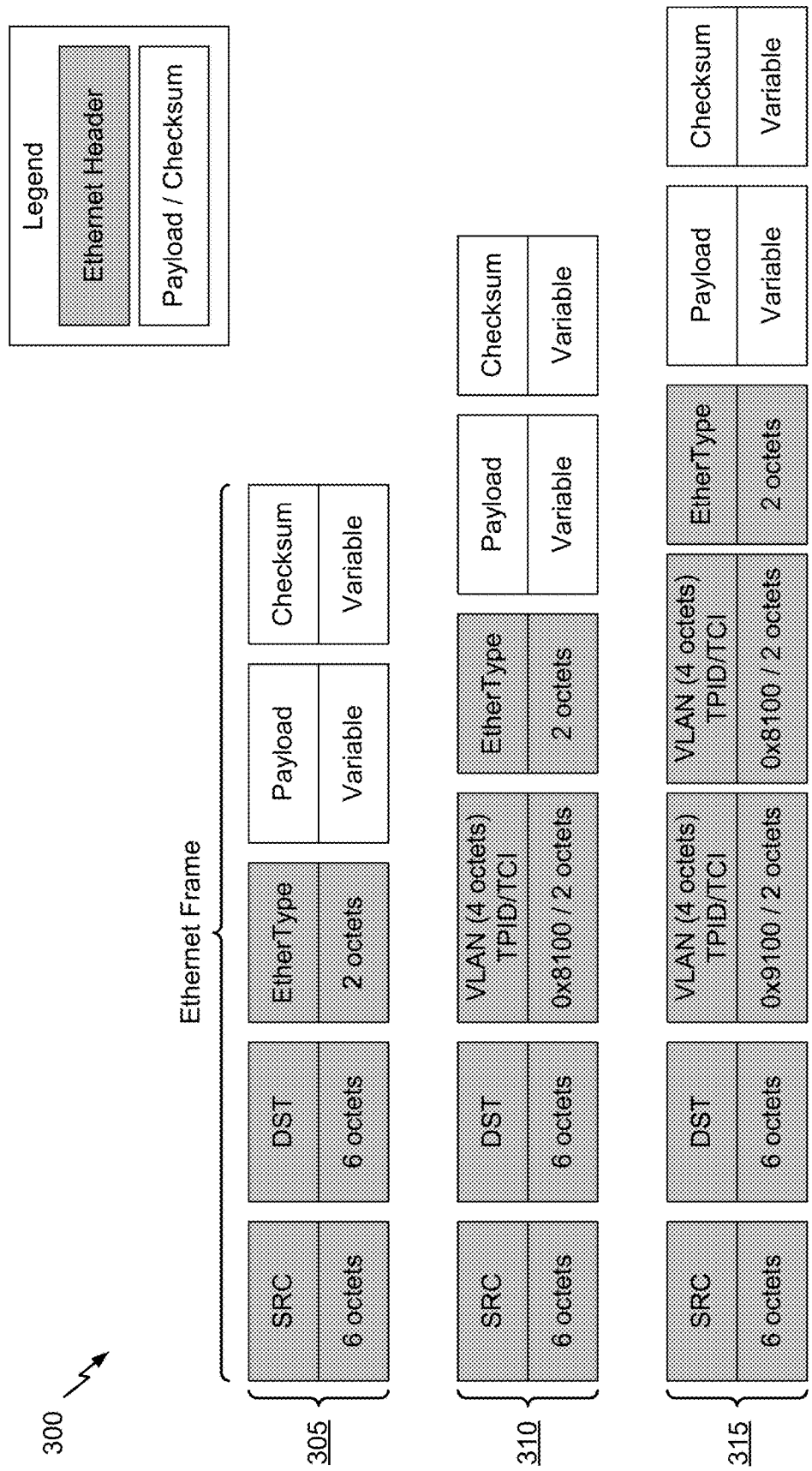
FIG. 3 is a diagram illustrating example Ethernet headers, in accordance with various aspects of the present disclosure.

FIG. 3 is a diagram illustrating example Ethernet headers, in accordance with various aspects of the present disclosure.

FIG. 3 shows three different types of Ethernet headers of an Ethernet frame. As shown, different fields may be included in the Ethernet header depending on a specific Ethernet protocol being used to communicate. For example, a different number of fields may be included in the Ethernet header depending on whether virtual local area network (VLAN) information is carried in the Ethernet header and a number of VLANs for which VLAN information is carried in the Ethernet header. As a result, the size of the Ethernet header may vary depending on such factors.

As shown by reference number 305, a first type of Ethernet header may be used when VLAN tagging is not used. In this case, the Ethernet header may include a source address identifier (e.g., a source media access control (MAC) address and/or the like, shown as SRC), a destination address identifier (e.g., a destination MAC address and/or the like, shown as DST), and an EtherType identifier used to indicate the type of protocol encapsulated in the payload of the Ethernet frame and/or the size of the Ethernet frame. In the first type of Ethernet header, the source address identifier may be 6 bytes, the destination address identifier may be 6 bytes, and the EtherType identifier may be 2 bytes, for a total of 14 bytes for the Ethernet header.

As shown by reference number 310, a second type of Ethernet header may be used when VLAN tagging is used, and when a single VLAN tag is used (e.g., sometimes referred to as single tagging). In this case, the Ethernet header may include the source address identifier, the destination address identifier, the EtherType identifier, and a single VLAN tag field. A VLAN tag field may sometimes be referred to as an 802.1Q tag, and may include a tag protocol identifier (TPID) field (e.g., 2 bytes) and a tag control information (TCI) field (e.g., 2 bytes). The TCI field may include a priority code point (PCP) field (e.g., 3 bits), a drop eligible indicator (DEI) field (e.g., 1 bit), and a VLAN identifier (VID) field (e.g., 12 bits). In some aspects, if the Ethernet header includes a single VLAN tag field, that VLAN tag field may be referred to as a customer tag (C-TAG) field. In the second type of Ethernet header, the source address identifier may be 6 bytes, the destination address identifier may be 6 bytes, the EtherType identifier may be 2 bytes, and the VLAN tag field may be 4 bytes, for a total of 18 bytes for the Ethernet header.

As shown by reference number 315, a third type of Ethernet header may be used when VLAN tagging is used, and when two VLAN tags are used (e.g., sometimes referred to as double tagging). In this case, the Ethernet header may include the source address identifier, the destination address identifier, the EtherType identifier, a first VLAN tag field, and a second VLAN tag field. In some aspects, if the Ethernet header includes two VLAN tag fields, one of the VLAN tag fields may be referred to as a customer tag (C-TAG) field, and the other VLAN tag field may be referred to as a service tag (S-TAG) field. In the third type of Ethernet header, the source address identifier may be 6 bytes, the destination address identifier may be 6 bytes, the EtherType identifier may be 2 bytes, the first VLAN tag field may be 4 bytes, and the second VLAN tag field may be 4 bytes, for a total of 22 bytes for the Ethernet header.

Thus, as indicated above, the Ethernet header may contribute between 14 bytes and 22 bytes of overhead to a packet that carries Ethernet frames over PDCP, 5G, and/or the like. The types of Ethernet headers described above and shown in FIG. 3 are provided as examples, and other types of Ethernet headers (e.g., of different size) may be used in some cases. As will be described in more detail below, some techniques and apparatuses described herein reduce packet overhead by compressing or removing all or part of Ethernet headers when certain conditions are satisfied. Some of these techniques may be performed in association with packet filtering, thereby improving efficiencies in Ethernet header removal.

As indicated above, FIG. 3 is provided merely as an example. Other examples are possible and may differ from what was described with regard to FIG. 3.

Figure 4:
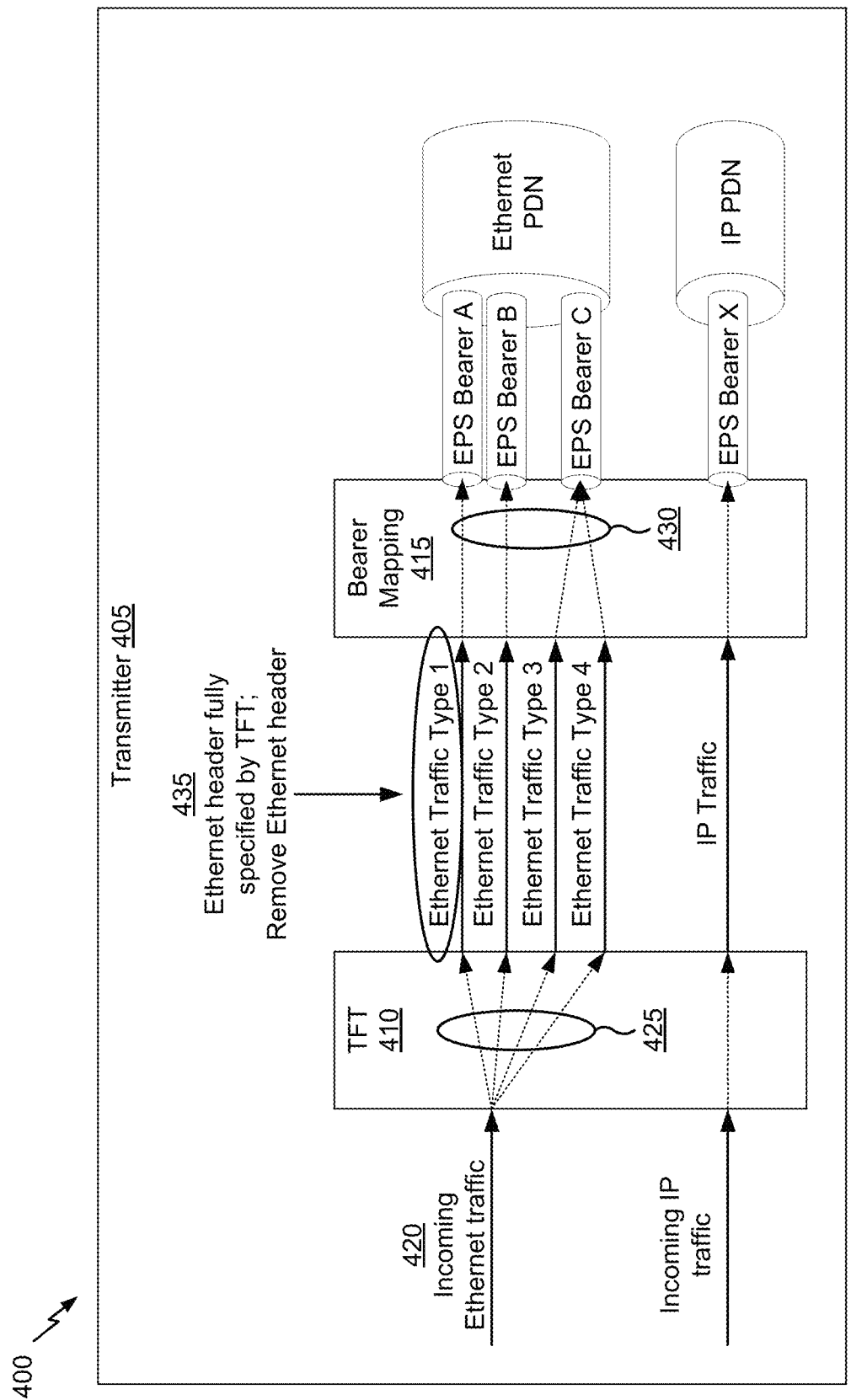
FIGS. 4-7 are diagrams illustrating examples of Ethernet header removal for Ethernet frame delivery over New Radio, in accordance with various aspects of the present disclosure.

FIG. 4 is a diagram illustrating an example 400 of Ethernet header removal for Ethernet frame delivery over New Radio, in accordance with various aspects of the present disclosure.

As shown in FIG. 4, a transmitter 405 (e.g., a base station 110, a UE 120, a network controller 130, such as a UPF device, and/or the like) may include a traffic flow template (TFT) component 410 and a bearer mapping component 415. The TFT component 410 may store one or more traffic flow templates, and may use the traffic flow templates to map incoming traffic (e.g., traffic input in to the TFT component 410) to a specific traffic flow. A traffic flow may refer to a set of related packets, such as packets having one or more field values that match a specific value or a set of values.

For example, as shown by reference number 420, the TFT component 410 may receive Ethernet traffic (e.g., Ethernet frames), and may map the Ethernet traffic to a traffic flow based on a type of the Ethernet traffic. The type may be determined based at least in part on a set of values in a corresponding set of fields of the Ethernet traffic, such as fields of an Ethernet header, as described above in connection with FIG. 3. The TFT component 410 may read the Ethernet header of an incoming Ethernet frame, determine whether one or more field values of the Ethernet header satisfy a set of conditions (e.g., match one or more values of a set of stored values), and may map the Ethernet frame to a specific traffic flow (e.g., shown as Ethernet Traffic Types 1 through 4), as shown by reference number 425. The TFT component 410 may map the Ethernet frame to a traffic flow based at least in part on which conditions are satisfied (e.g., using sequential filters) and/or whether any conditions are satisfied. In some aspects, if the Ethernet frame does not match any of the stored traffic flow templates, then the TFT component 410 may map the Ethernet frame to a default flow. As shown, the TFT component 410 may perform similar operations for other types of network traffic, such as internet protocol (IP) traffic (e.g., by reading an IP header).

As shown by reference number 430, the bearer mapping component 415 may map network traffic (e.g., Ethernet traffic, IP traffic, and/or the like) to a bearer (e.g., a radio bearer, and evolved packet system (EPS) bearer, and/or the like) based at least in part on the type of the network traffic. A bearer may carry one or more classes of network traffic, and may be assigned a quality of service class indicator (QCI) value for traffic prioritization. In some cases, there may be a one-to-one mapping of traffic type to bearer, as shown by Ethernet Traffic Type 1 being mapped to EPS Bearer A and Ethernet Traffic Type 2 being mapped to EPS Bearer B. In some cases, there may be a many-to-one mapping of traffic type to bearer, as shown by Ethernet Traffic Types 3 and 4 being mapped to EPS Bearer C. As shown, the transmitter 405 may transmit Ethernet traffic on bearers associated with an Ethernet PDN. As shown, the bearer mapping component 415 may perform similar operations for other types of network traffic, such as IP traffic.

As shown by reference number 435, in some aspects, an Ethernet header may be fully specified by a traffic flow template stored by the TFT component 410. For example, the traffic flow template may include a specific value for all required fields of the Ethernet header (e.g., depending on a type of Ethernet header), and the values of those required fields in the Ethernet header may match the values included in the traffic flow template for each of those required fields. Additional details explaining fully specified Ethernet headers are described below in connection with FIG. 5. In this case, only a single type of Ethernet traffic is transmitted on a specific bearer. As will be described in more detail below in connection with FIG. 5, the transmitter 405 may remove the Ethernet header from a packet when the Ethernet header is fully specified by a traffic flow template, thereby conserving network resources, reducing overhead, and/or the like. In the case where multiple types of Ethernet traffic (e.g., having different values in respective Ethernet headers) map to a single bearer (e.g., shown as Ethernet Traffic Types 3 and 4 mapping to EPS Bearer C), the transmitter 405 may not remove the Ethernet header because the Ethernet header is not fully specified by the traffic flow template in this case. Additional details of operations performed by the transmitter 405 are provided below in connection with FIG. 5.

In some aspects, the removal of the Ethernet header may be performed by the TFT component 410, the bearer mapping component 415, and/or another component of the transmitter 405. In some aspects, the Ethernet header may be removed after and/or in connection with filtering traffic using traffic flow templates. Additionally, or alternatively, the Ethernet header may be removed after and/or in connection with mapping traffic to a bearer.

As indicated above, FIG. 4 is provided merely as an example. Other examples are possible and may differ from what was described with regard to FIG. 4.

Figure 5:
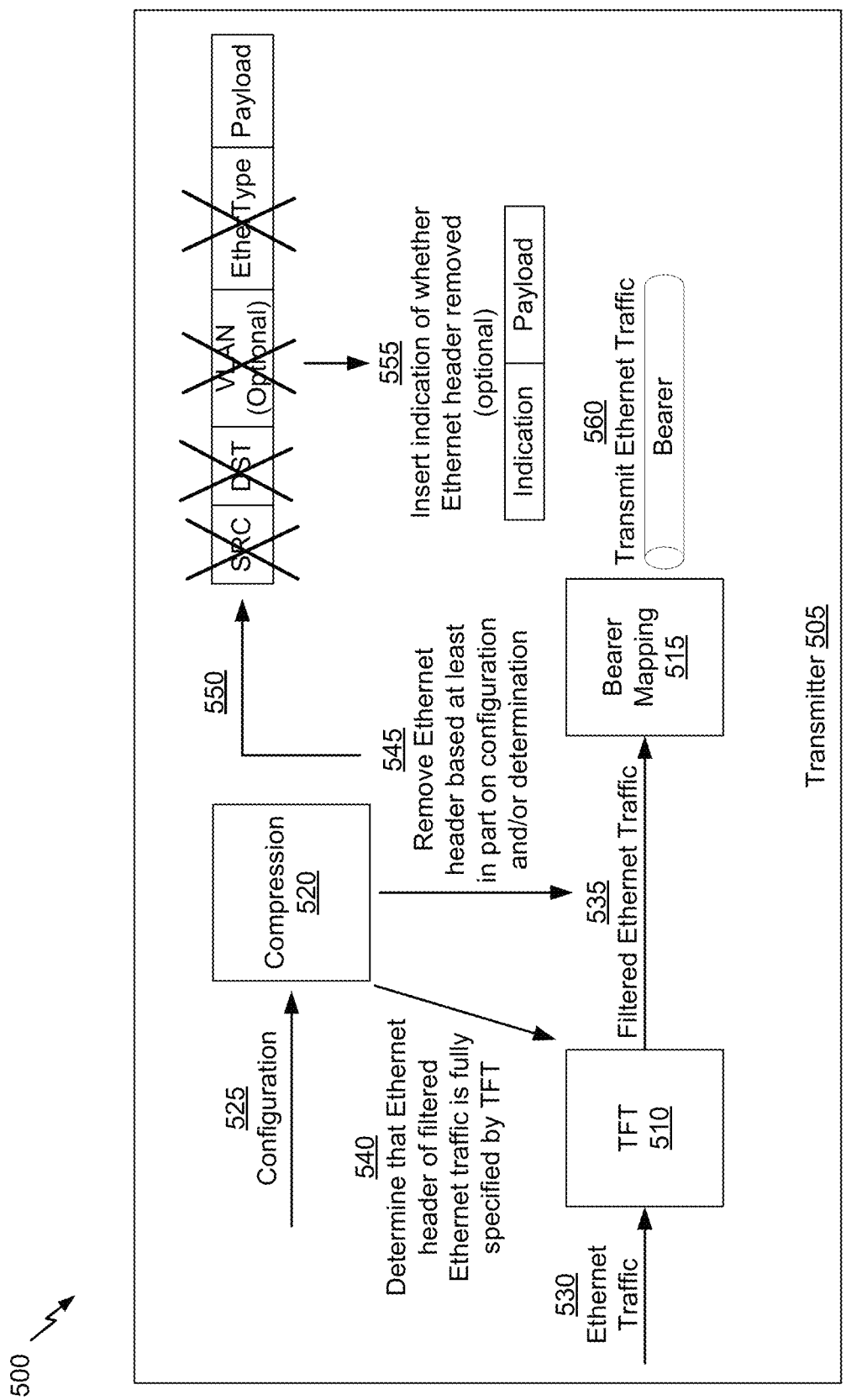

FIG. 5 is a diagram illustrating another example 500 of Ethernet header removal for Ethernet frame delivery over New Radio, in accordance with various aspects of the present disclosure.

FIG. 5 shows example operations performed by a transmitter 505 in connection with Ethernet header removal for Ethernet frame delivery over New Radio (e.g., over PDCP). In some aspects, the transmitter 505 may correspond to the transmitter 405 described above in connection with FIG. 4. Additionally, or alternatively, the transmitter 505 may be a base station 110, a UE 120, a network controller 130 (e.g., a UPF device and/or the like), and/or the like. As shown, the transmitter 505 may include a TFT component 510 (e.g., which may correspond to the TFT component 410 of FIG. 4), a bearer mapping component 515 (e.g., which may correspond to the bearer mapping component 415 of FIG. 4), and/or a compression component 520. These components may include hardware, firmware, or a combination of hardware and software. For example, these components may include one or more components described above in connection with FIG. 2. In some aspects, the compression component 520 may be integrated into the TFT component 510 and/or the bearer mapping component 515. Alternatively, the compression component 520 may be a separate component.

As shown by reference number 525, the transmitter 505 (e.g., the compression component 520) may determine a configuration relating to Ethernet header compression for Ethernet frames to be transported over PDCP, 5G, and/or the like. In some aspects, the transmitter 505 may receive the configuration from another device. For example, a UE 120 may receive the configuration from a base station 110 (e.g., when may generate the configuration and/or receive the configuration from a network controller 130). Additionally, or alternatively, a base station 110 may receive the configuration from a network controller 130 (e.g., a UPF device). In some aspects, the transmitter 505 may generate the configuration. For example, a base station 110 and/or a network controller 130 may generate the configuration.

The configuration may indicate whether an Ethernet header is to be removed from traffic (e.g., network traffic, one or more packets, and/or the like) that maps to a specific bearer. Additionally, or alternatively, the configuration may indicate whether an Ethernet header is to be removed from traffic when the Ethernet header is fully specified by a traffic flow template (e.g., that maps the traffic to a specific bearer). In some aspects, the configuration may be generated and/or indicated in association with establishing the specific bearer. Additionally, or alternatively, the configuration may be indicated in a radio resource control (RRC) message (e.g., an RRC configuration message, an RRC reconfiguration message, and/or the like), a non-access stratum (NAS) message, and/or the like. Additionally, or alternatively, the configuration may be signaled using a traffic flow template format, thereby increasing efficiency when header removal is applied in combination with traffic flow template filtering.

In some aspects, the configuration may indicate whether the transmitter 505 is to transmit packets, that include Ethernet frames, with or without an indication of whether the Ethernet header has been removed from the packets. This indication may be used by a receiver of the packets to determine whether the packets include Ethernet headers, to determine whether the receiver is to reconstruct the Ethernet headers for the packets, and/or the like.

As shown by reference number 530, the TFT component 510 may receive Ethernet traffic to be transmitted on a bearer (e.g., via 5G, PDCP, and/or the like), as described above in connection with FIG. 4. The TFT component 510 may apply one or more filters to the incoming Ethernet traffic to generate filtered Ethernet traffic that maps to a traffic flow, as shown by reference number 535 and as described above in connection with FIG. 4.

As shown by reference number 540, the compression component 520 may determine that an Ethernet header of the filtered Ethernet traffic is fully specified by a traffic flow template stored by the TFT component 510. The Ethernet header may be fully specified by a traffic flow template when the traffic flow template includes a specific value (e.g., and not a range of values) for all required fields of the Ethernet header, and each of those specific values match a corresponding value for a corresponding field included in the Ethernet header (e.g., of incoming Ethernet traffic).

For a first type of Ethernet traffic, the required fields may be the source address field, the destination address field, and the EtherType field. For other types of Ethernet headers, the required fields may be the source address field, the destination address field, the EtherType field, and all VLAN tag fields, which may include a single VLAN tag field in the case of single tagging or two VLAN tag fields in the case of double tagging. For example, for a second type of Ethernet header, the required fields may be the source address field, the destination address field, the EtherType field, and a single VLAN tag field. For a third type of Ethernet header, the required fields may be the source address field, the destination address field, the EtherType field, a first VLAN tag field (e.g., a C-TAG field), and a second VLAN tag field (e.g., an S-TAG field). Additionally, or alternatively, the Ethernet header may be fully specified by a traffic flow template when only packets with the same Ethernet header (e.g., the same values for Ethernet header fields) map to a flow and/or bearer indicated by the traffic flow template.

If the traffic flow template does not store a specific value for one or more required fields of the Ethernet header, then the traffic flow template cannot fully specify any Ethernet header (e.g., where the traffic flow template does not store a specific value for the EtherType field). For a specific Ethernet header, if a value of any required field of that specific Ethernet header does not match a corresponding value stored by the traffic flow template (e.g., for the same field), then that specific Ethernet header is not fully specified by the traffic flow template.

As shown by reference number 545, the compression component 520 may remove the Ethernet header from the filtered Ethernet traffic (e.g., one or more packets) based at least in part on the configuration and/or the determination that the Ethernet header of the filtered Ethernet traffic is fully specified by a traffic flow template. In some aspects, the configuration may indicate that an Ethernet header is to be removed from Ethernet traffic that maps to a specific bearer, and the compression component 520 may remove the Ethernet header from the Ethernet traffic based at least in part on determining that the Ethernet traffic maps to the specific bearer. In some cases, the compression component 520 need not determine whether the Ethernet header is fully specified by a traffic flow template because the configuration may ensure that only fully specified Ethernet headers are configured for Ethernet header removal.

In some aspects (e.g., if the configuration does not ensure that only fully specified Ethernet headers are configured for Ethernet header removal), then the compression component 520 may determine whether the Ethernet header is fully specified, and may remove the Ethernet header if the Ethernet header is fully specified. In some aspects, the Ethernet header may be removed by default if the Ethernet header is fully specified. Additionally, or alternatively, the compression component 520 may determine whether a configuration for the bearer indicates that the Ethernet header is to be removed from Ethernet traffic that maps to the bearer. In this case, if the configuration indicates that the Ethernet header is to be removed and if the Ethernet header is fully specified, then the compression component 520 may remove the Ethernet header. However, if the configuration indicates that the Ethernet header is not to be removed, then the compression component 520 may refrain from removing the Ethernet header regardless of whether the Ethernet header is fully specified by a traffic flow template.

As shown by reference number 550, removing the Ethernet header may include removing all fields of the Ethernet header from the packet(s) to be transmitted (but leaving the Ethernet payload). For example, for a first type of Ethernet header, the compression component 520 may remove all values of the source address field, the destination address field, and the EtherType field. For other types of Ethernet headers, the compression component 520 may remove all values of the source address field, the destination address field, the EtherType field, and all VLAN tag fields. For example, for a second type of Ethernet header, the compression component 520 may remove all values of the source address field, the destination address field, the EtherType field, and a single VLAN tag field. Similarly, for a third type of Ethernet header, the compression component 520 may remove all values of the source address field, the destination address field, the EtherType field, a first VLAN tag field (e.g., a C-TAG field), and a second VLAN tag field (e.g., an S-TAG field).

As shown by reference number 555, in some aspects, the transmitter 505 may insert, in a packet that includes an Ethernet payload, an indication of whether an Ethernet header was removed from the packet. As described above, in some aspects, the configuration may indicate whether to insert this indication, and the transmitter 505 may determine whether to insert this indication based at least in part on the configuration. In some aspects, Ethernet headers may be removed from all packets transmitted via a specific bearer, and a receiver may be notified as such. In this case, the receiver does not need an indication of whether the Ethernet header has been removed from a packet transmitted via the specific bearer. Thus, the indication need not be transmitted, thereby conserving processing power, network resources, and/or the like. However, in some cases, Ethernet headers may not be removed from all packets transmitted via a specific bearer. In this case, the receiver may need an indication of whether the Ethernet header has been removed from a packet in order to properly process the packet.

In some aspects, if the indication of whether the Ethernet header has been removed is included in the packet, the indication may be included in a field of a service data adaptation protocol (SDAP) header and/or a field of a PDCP header. In some aspects, the indication may be a single bit, which may be set to a first value (e.g., 1) when the Ethernet header has been removed, or may be set to a second value (e.g., 0) when the Ethernet header has not been removed.

As shown by reference number 560, the transmitter 505 may transmit the Ethernet traffic (e.g., one or more packets that include the Ethernet payload) via a bearer to which the Ethernet traffic is mapped (e.g., by the bearer mapping component 515). If the Ethernet header is removed from a packet, then the portion of the packet that carries the Ethernet frame may include only the Ethernet payload (e.g., and not the Ethernet header). If the Ethernet header is not removed from a packet, then the portion of the packet that carries the Ethernet frame may include the Ethernet payload and the Ethernet header. In either case, the Ethernet checksum (e.g., cyclic redundancy check (CRC)) may be removed from the packet (e.g., via a PDCP function). In some aspects, the packet may include an indication of whether the Ethernet header was removed (e.g., according to a configuration), as described above.

By removing the Ethernet header when the Ethernet header is fully specified by the traffic flow template, network resources may be conserved without negatively impacting reception of an Ethernet frame, since a receiver will be capable of reconstructing the Ethernet header due to the full specification of the Ethernet header by the traffic flow template, as described in more detail below in connection with FIG. 6. In this way, an amount of overhead created by Ethernet headers transported over a 5G, PDCP, and/or the like may be reduced. This may save significant overhead, particularly for small payloads and/or packet sizes.

As indicated above, FIG. 5 is provided merely as an example. Other examples are possible and may differ from what was described with regard to FIG. 5.

Figure 6:
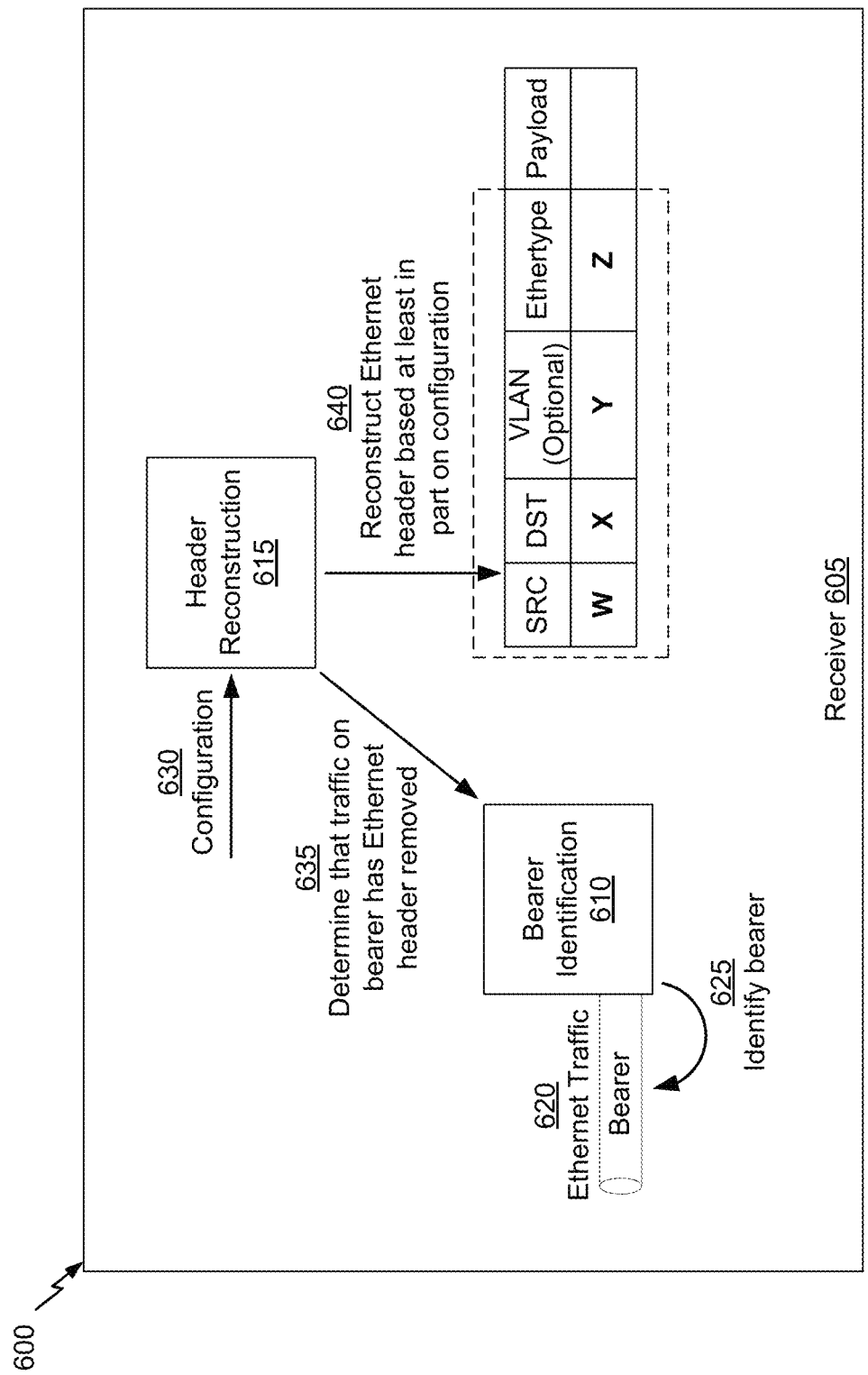

FIG. 6 is a diagram illustrating another example 600 of Ethernet header removal for Ethernet frame delivery over New Radio, in accordance with various aspects of the present disclosure.

FIG. 6 shows example operations performed by a receiver 605 in connection with Ethernet header removal for Ethernet frame delivery over New Radio (e.g., over PDCP). In some aspects, the receiver 605 may be a base station 110, a UE 120, a network controller 130 (e.g., a UPF device and/or the like), and/or the like. As shown, the receiver 605 may include a bearer identification component 610 and/or a header reconstruction component 615. These components may include hardware, firmware, or a combination of hardware and software. For example, these components may include one or more components described above in connection with FIG. 2.

As shown by reference number 620, the receiver 605 may receive a packet, which may include Ethernet traffic. For example, the packet may be a packet that includes an Ethernet payload, which may be transmitted by a transmitter 505, as described above in connection with FIG. 5.

As shown by reference number 625, the receiver 605 (e.g., the bearer identification component 610) may identify a bearer associated with the received packet. For example, the bearer may be identified based at least in part on a QCI value, a bearer identifier, and/or the like, which may be included in the packet.

As shown by reference number 630, the receiver 605 (e.g., the header reconstruction component 615) may determine a configuration relating to Ethernet header compression for Ethernet frames to be transported over PDCP, 5G, and/or the like, in a similar manner as described above in connection with FIG. 5. In some aspects, the receiver 605 may receive the configuration from another device. For example, a UE 120 may receive the configuration from a base station 110. Additionally, or alternatively, a base station 110 may receive the configuration from a network controller 130. In some aspects, the receiver 605 may generate the configuration. For example, a base station 110 and/or a network controller 130 may generate the configuration. The configuration may be associated with a bearer.

As described above in connection with FIG. 5, in some aspects, the configuration may be generated and/or indicated in association with establishing the bearer. Additionally, or alternatively, the configuration may be indicated in an RRC message, a NAS message, and/or the like. Additionally, or alternatively, the configuration may be signaled using a traffic flow template format.

As shown by reference number 635, the receiver 605 (e.g., the header reconstruction component 615) may determine that an Ethernet header has been removed from traffic on the bearer. For example, the receiver 605 may determine that the bearer is associated with a configuration indicating that an Ethernet header is to be removed from traffic associated with the bearer. In some aspects, the configuration may indicate that all packets received via a specific bearer will be received without an Ethernet header (e.g., will have the Ethernet header removed). In this case, the receiver 605 may determine that an Ethernet header has been removed from a packet when the packet is received via the specific bearer, and may reconstruct an Ethernet header for the packet, as described below. In some aspects, the configuration may indicate that a packet received via a specific bearer will include an indication of whether an Ethernet header has been removed from the packet (e.g., in an SDAP header, a PDCP header, and/or the like). In this case, the receiver 605 may read the indication from the packet to determine whether the Ethernet header has been removed from the packet. If the indication indicates that the Ethernet header has been removed from the packet, then the receiver 605 may reconstruct an Ethernet header for the packet, as described below.

As shown by reference number 640, the receiver 605 (e.g., the header reconstruction component 615) may reconstruct the Ethernet header for the Ethernet frame in the packet based at least in part on the configuration. For example, the configuration may indicate values for fields of the Ethernet header (e.g., a source address field, a destination address field, an EtherType field, and/or one or more VLAN tag fields), and the receiver 605 may read the configuration to determine specific values to be inserted in specific fields of the Ethernet header. The receiver 605 may recreate the fields and/or insert the indicated values in those fields to reconstruct the Ethernet header.

By removing an Ethernet header at a transmitter when the Ethernet header is fully specified by the traffic flow template, such that the Ethernet header can be reconstructed by a receiver 605 (e.g., due to a mapping of Ethernet header values to a bearer, as indicated in the configuration), network resources may be conserved without negatively impacting reception of an Ethernet frame.

As indicated above, FIG. 6 is provided merely as an example. Other examples are possible and may differ from what was described with regard to FIG. 6.

Figure 7:
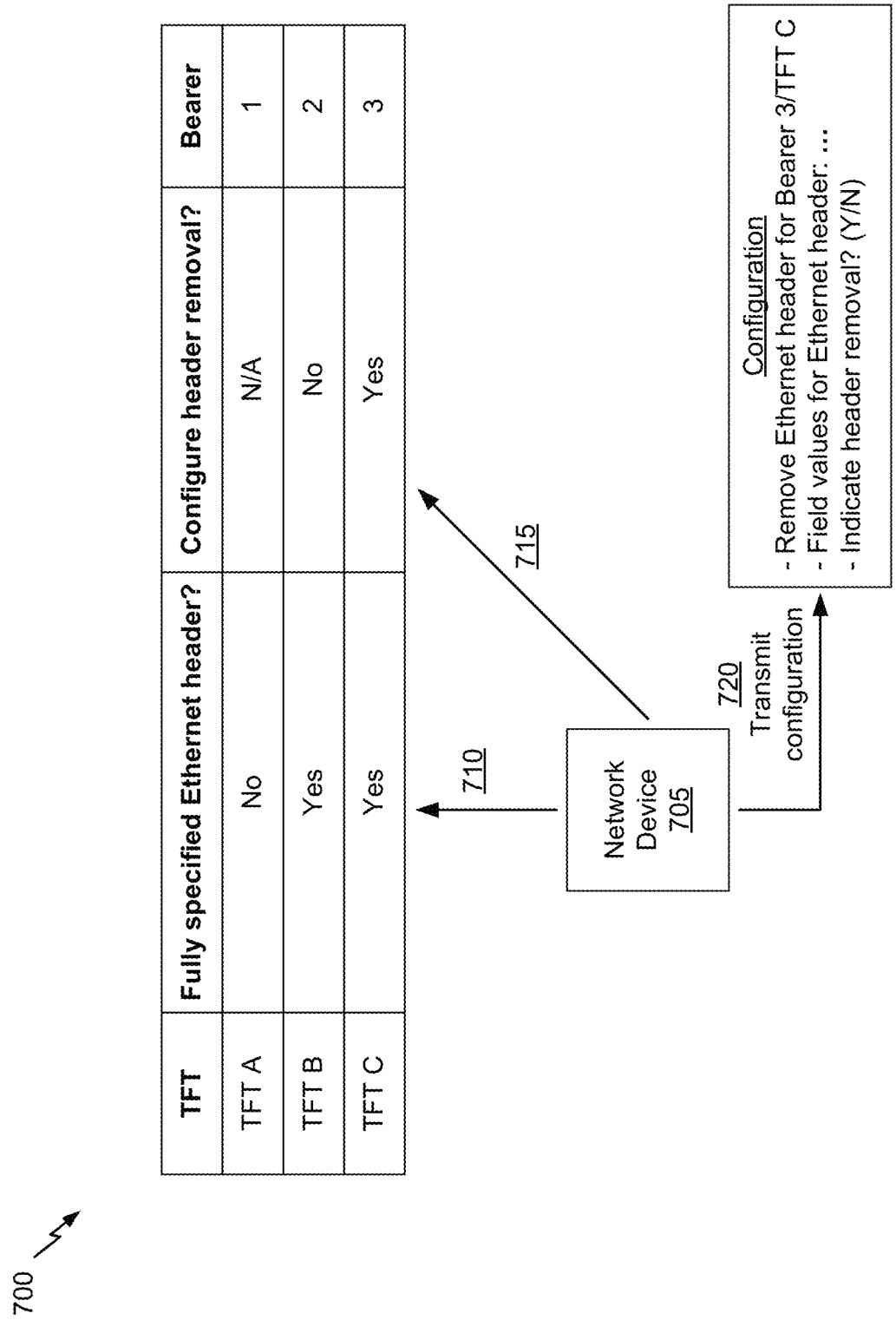

FIG. 7 is a diagram illustrating another example 700 of Ethernet header removal for Ethernet frame delivery over New Radio, in accordance with various aspects of the present disclosure.

FIG. 7 shows example operations performed by a network device 705 in connection with Ethernet header removal for Ethernet frame delivery over New Radio (e.g., over PDCP). In some aspects, the network device 705 may be a base station 110, a network controller 130 (e.g., a UPF device, an AMF device, an SMF device, and/or the like), and/or the like. In some aspects, the network device 705 may be the same device as the transmitter 505. In some aspects, the network device 705 may be the same device as the receiver 605.

As shown by reference number 710, the network device 705 may determine that an Ethernet header is fully specified by a traffic flow template that maps traffic to a bearer. In some aspects, the network device 705 may make this determination when a bearer is being established. The network device 705 may identify the bearer to be established, may identify a traffic flow template that maps traffic to the bearer, and may determine whether the traffic flow template fully specifies an Ethernet header. As shown, a first traffic flow template (e.g., shown as TFT A) does not fully specify an Ethernet header, so Ethernet header removal may not be permitted for traffic transmitted by a bearer to which the first traffic flow template maps the traffic.

As shown by reference number 715, the network device 705 may determine whether to configure Ethernet header removal for the traffic flow template and/or the bearer. In some aspects, the network device 705 may determine whether to configure Ethernet header removal based at least in part on a capability, of a transmitter and/or a receiver associated with the bearer, to support Ethernet header removal. In some aspects, such capability may be indicated to the network device 705 (e.g., in a UE capability report, a base station capability report, and/or the like). In some aspects, if the transmitter and the receiver do not both support Ethernet header removal, then the network device 705 may determine not to configure Ethernet header removal, regardless of whether the Ethernet header is fully specified by the traffic flow template (e.g., as shown in the case of TFT B). In some aspects, if both the transmitter and the receiver support Ethernet header removal and the Ethernet header is fully specified, then the network device 705 may configure Ethernet header removal for the bearer and/or traffic flow templates (e.g., as shown in the case of TFT C).

As shown by reference number 720, the network device 705 may transmit a configuration that indicates whether the Ethernet header is to be removed from traffic that maps to the bearer. As indicated elsewhere herein, the configuration may be generated and/or transmitted in association with establishing the bearer. Additionally, or alternatively, the configuration may be indicated in an RRC message, a NAS message, and/or the like. Additionally, or alternatively, the configuration may be signaled using a traffic flow template format.

As shown, if the network device 705 determines that an Ethernet header is to be removed from traffic that maps to a bearer, the configuration may indicate that the Ethernet header is to be removed from such traffic. As further shown, the configuration may indicate field values for the Ethernet header (e.g., for all fields that are removed from the Ethernet header). The network device 705 may determine the field values based at least in part on the traffic flow template, which may indicate the specific values for the field when the Ethernet header is fully specified by the traffic flow template. In this way, a receiver can reconstruct the Ethernet header when the Ethernet header has been removed.

As further shown, in some aspects, the configuration may indicate whether traffic that maps to the bearer is to include an indication of whether the Ethernet header has been removed from the traffic. In this way, a transmitter can include such indication when necessary, and a receiver can use such indication to determine whether to reconstruct the Ethernet header, as described elsewhere herein.

As indicated above, FIG. 7 is provided merely as an example. Other examples are possible and may differ from what was described with regard to FIG. 7.

Referring to FIGS. 8-15, various aspects of performing Ethernet header compression context state management are described. Ethernet header compression may be configured per data radio bearer (e.g., dedicated radio bearer), for the uplink and /or for the downlink. In an implementation, for example, the Ethernet packets may be grouped into flow, and each flow can be assigned a context identifier (ID). The transmitter may identify a start of transmission of a new context to the receiver by transmitting at least one packet with a full Ethernet header and the corresponding context ID. Then, the transmitter may transmit compressed Ethernet packets that omit the full Ethernet header and replace it with an Ethernet compression header, which may include a type indicator and the context ID. In some cases, the transmitter may wait to receive a new context setup acknowledgement from the receiver before initiating transmission of the compressed Ethernet packets of a new context. In some cases, when the transmitter is assigning the context ID to a flow, the transmitter may desire to reuse a previously-used context ID. In this case, the transmitter may transmit a context ID deletion message to the receiver in order to ensure the receiver clears settings associated with the previously-used context ID. As such, the transmitter may wait to receive a context ID deletion acknowledgment from the receiver before initiating transmission of the Ethernet packets associated with a re-used context ID.

Figure 8:
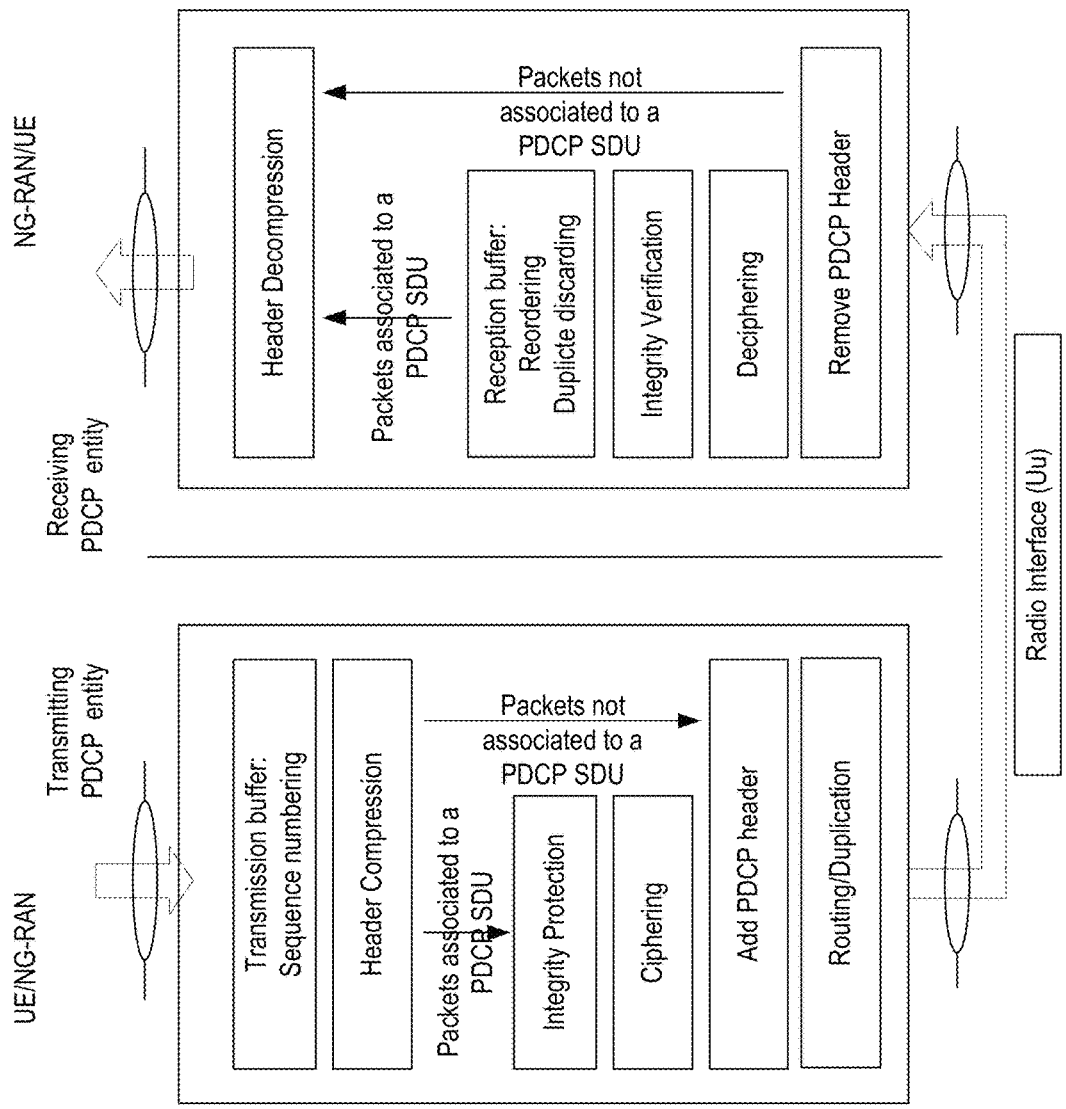

Referring to FIG. 8, in some aspects, the Ethernet header compression and header decompression as described herein may be performed by a Ethernet header compression function and an Ethernet header decompression function. Both of these functions may be a part of a respective packet data convergence protocol (PDCP) function of a transmitting PDCP entity or a receiving PDCP entity that is part of a protocol layer on a transmitter or a receiver.

In an aspect, the Ethernet header compression function defines its own Ethernet compression sub-header, which may include a type and context ID, as will be described in more detail below. FIG. 3, as described above, shows example Ethernet headers of an Ethernet frame. In an aspect, the Ethernet compression sub-header may omit some or all of the fields of the Ethernet header.

The Ethernet header may not include variable fields such as a sequence number or a timestamp. Further, Ethernet packets may correspond to specific flows with repeated values in the Ethernet packet header, such as the value of the source, the value of the destination, or the value of the Ethernet type. For example, a flow of Ethernet packets may be a control or automation flow between a controller and a sensor or an actuator (e.g., a time sensitive network (TSN) flow), a logging or diagnostic flow between a server and a machine, a management or provisioning flow between a provisioning system and a machine, or a safety flow between a safety panel and an alarm. Accordingly, multiple Ethernet packets sent from a transmitting UE to a receiving UE through a radio access network interface may have the same header, or may include a header with continually repeated values.

Some flows may benefit from header compression. For example, flows with small packets (e.g., automation flows) may find header compression especially beneficial. Some flows (e.g., automation flows) require low latency on their packets and may need compression and decompression operations to minimally impact that latency.

Figure 9:
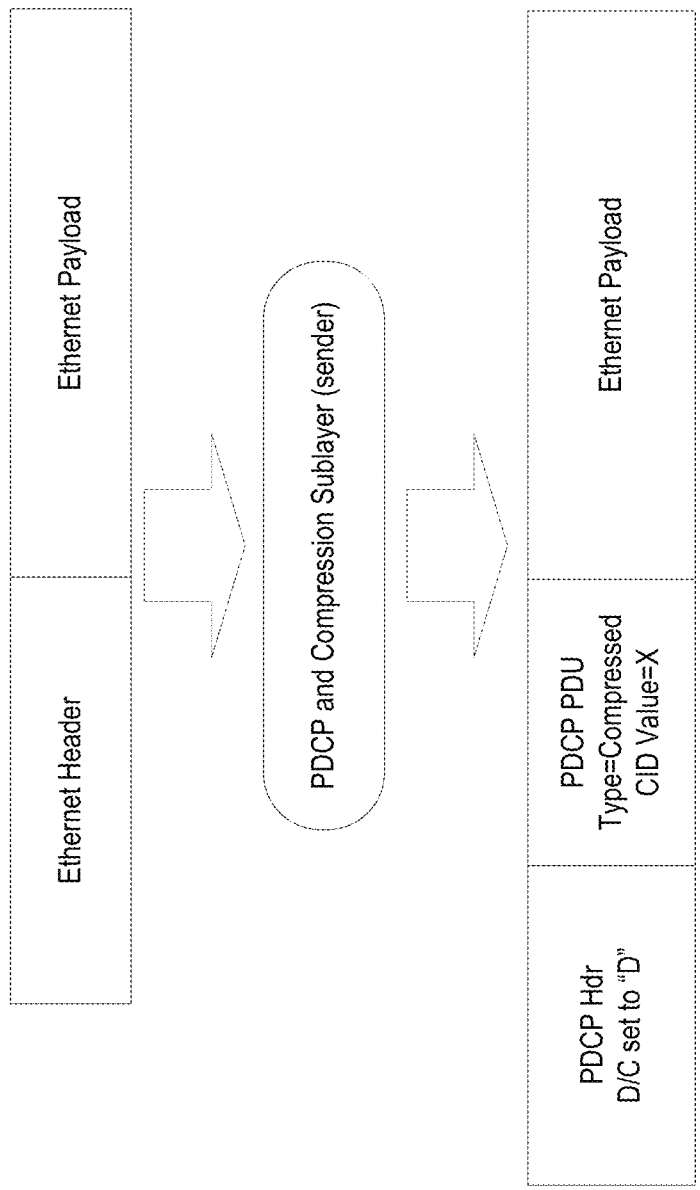

Referring to FIG. 9, an Ethernet packet is converted into a compressed header Ethernet packet. The Ethernet packet includes an Ethernet packet header and an Ethernet packet payload. The PDCP and compression sublayer at the transmitter (e.g., transmitter 405 or transmitter 505) removes the Ethernet packet header and replaces it with an Ethernet compression sub-header, while adding the PDCP header. The PDCP PDU including an Ethernet compression sub-header may include a PDCP PDU header value, a PDCP PDU type value, and/or a context identifier value where the context identifier may be included in the Ethernet compression sub-header. In some aspects, the PDCP PDU header value may be set to data, indicating that an Ethernet payload including data is attached to the Ethernet compression sub-header. In some aspects, the PDCP PDU header value may be set to data, and no data or padding bits are attached to the Ethernet compression sub-header. In some aspects, the PDCP PDU header value may be set to control, indicating that the packet serves a control function and that an Ethernet payload may not be included. The PDCP PDU type value may be set to "compressed" or may otherwise indicate that this is a packet with a compressed Ethernet header based on a context identifier. The context identifier value may identify which Ethernet header values should be associated with the compressed Ethernet packet.

Compression of partial fields of a header may involve additional complexity for compression and decompression. Definition of compressed header formats that include some Ethernet header fields and remove other Ethernet header fields, which could have a large number of combinations of included/omitted fields; compressor processing to create the header with partial compression; and decompressor processing to create the full header based on the received header all add complexity to compression and decompression. The Ethernet compression sub-header of FIG. 9 may avoid this added complexity by replacing the entire Ethernet packet header and representing the values therein using the context identifier value.

Figure 10:
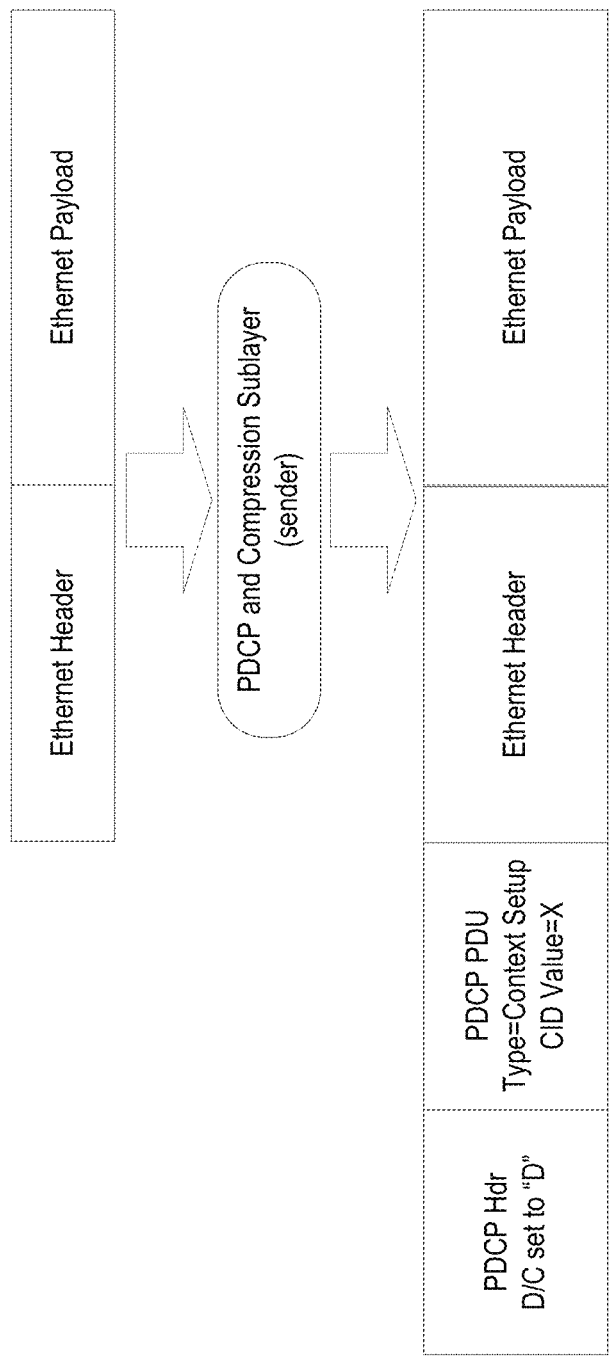

Referring to FIG. 10, a packet for creation of compression context is described. The PDCP and compression sublayer at the transmitter (e.g., transmitter 405 or transmitter 505) attaches a context creation header to the Ethernet packet, and sends a packet including the context creation header, the Ethernet packet header, and the Ethernet packet payload to a receiver (e.g., receiver 605). The PDCP PDU including context creation header may include a PDCP PDU header value, a PDCP PDU type value, and/or a context identifier value where the context identifier may be included in the Ethernet compression sub-header. The PDCP PDU header value may be set to data. The PDCP PDU type value may be set to "context setup" or may otherwise indicate that this packet should be used to establish a new context for Ethernet packet header compression. The context identifier value may identify the context identifier that should be associated with the values in the attached header going forward. Upon receiving the Ethernet packet with the context creation header, the receiver (e.g., receiver 605) may store the values of the attached Ethernet header value in association with the value of the context identifier. Upon receiving compressed header Ethernet packets, such as the packet described above with reference to FIG. 9 (having a PDCP PDU type value of "compressed"), the receiver may decompress the header by replacing the compressed header with the stored header values.

FIG. 11 illustrates Ethernet compression configuration packets (note that the PDCP PDU may be a PDCP data PDU or a PDCP control PDU). In some embodiments, a PDCP PDU including an Ethernet compression sub-header can include a PDCP PDU type and a PDCP PDU subtype associated with the context identifier value. For example, as shown in FIG. 11, the PDCP PDU type may be "Ethernet compression config" or may indicate that the header is for a packet performing a compression configuration function.

The subtype may identify what compression configuration function should be performed for the associated context identifier. For example, packet 1105 is a setup acknowledgement packet. The subtype can indicate that the header is a setup acknowledgement, to be sent from a receiver (e.g., receiver 605) to a transmitter (e.g., transmitter 405, transmitter 505) to indicate that a context creation packet having a context creation header (e.g., as described above with reference to FIG. 10), was received and that the context identifier has been set up accordingly.

After some time, the compressor (e.g., compression component 520) or the transmitter (e.g., transmitter 405 or transmitter 505) may realize that a certain context identifier is not receiving any traffic, and may therefore determine to associated a different flow (e.g., a different Ethernet header) with the context identifier. In some aspects, the transmitter may send a context create packet with a new compression context (e.g., a new Ethernet header) for an existing context identifier, with the receiver interpreting this create packet as replacing the old compression context. For example, this may be accomplished by sending the packet described above with reference to FIG. 10.

The decompressor (e.g., header reconstruction component 615) or receiver (e.g., receiver 605) may need to be prepared for any incoming packet to replace an existing compression context, in which case it may need to deliver this packet to higher layers within the tight URLLC deadlines, as well as execute context modification procedures. This adds complexity to the receive path for established context identifier. The decompressor or receiver may also need be prepared for frequent changes to the compression context (e.g., Ethernet packet header) for a given compression identifier, including cases when a context creation packet is received while the decompressor or receiver is in process of setting up a context for the previous received context creation packet. Finally, where PDCP is configured for out-of-order delivery and where context creation packets are sent close to each other, the decompressor may set its state to an older compression context, causing decompression errors.

In some aspects, the transmitter may first delete the compression context for that context identifier and subsequently create a new compression context for the context identifier. Packet 1110 is a context delete packet. It includes a subtype value "delete" in association with the context identifier. The transmitter may send packet 1110 to the receiver, and upon receiving packet 1110, the receiver may remove whatever association currently exists between an Ethernet header and the context identifier. Packet 1115 is a delete acknowledgement packet. It includes a subtype value "DeleteAck" in association with the context identifier. The receiver may transmit packet 1115 to the transmitter once the association between the Ethernet header and the context identifier is complete, so the transmitter knows that the context identifier is available to be reused.

Packets 1105, 1110, and 1115 all include a PDCP PDU header value set to "control," and accordingly do not include an Ethernet packet payload. It may be desirable to transmit these packets using PDCP control PDU packets, as then these packets can be sent at any time, without having to send data. In some aspects, the PDCP PDU header may be set to "data," and may include an Ethernet packet payload that is empty or that includes padding bits, and the receiver or transmitter receiving the packet may ignore the Ethernet packet payload. In some aspects, these packets may be transmitted using PDCP data PDUs since duplicate PDCP data PDUs are discarded at a receiving PDCP entity whereas duplicated PDCP control PDUs are not. Such duplicates may be created due to RLC retransmissions and duplicates can be reordered due to HARQ retransmissions. Discarding of duplicated PDCP data PDUs may improves the robustness of context management to reordering of context management messages (e.g., context delete message , context delete acknowledgement message) due to RLC retransmissions and HARQ retransmissions.

In some aspects, the PDCP compression sublayer supports sending of uncompressed packets for which compression is not needed, sending of uncompressed packets for context setup, and sending packets with compressed headers. Additional functions (e.g., acknowledgement for context setup) can be handled through the PDCP control plane and therefore may not need the definition of a compression sublayer header.

In some aspects, the compression sublayer header can includes two bits to identify whether the packet is uncompressed, is a context setup packet, or is a compressed packet. In some aspects, the compression sublayer header includes six bits for the context identifier, and the six bits may be ignored by the receiver when the packet is uncompressed.

Figure 12:
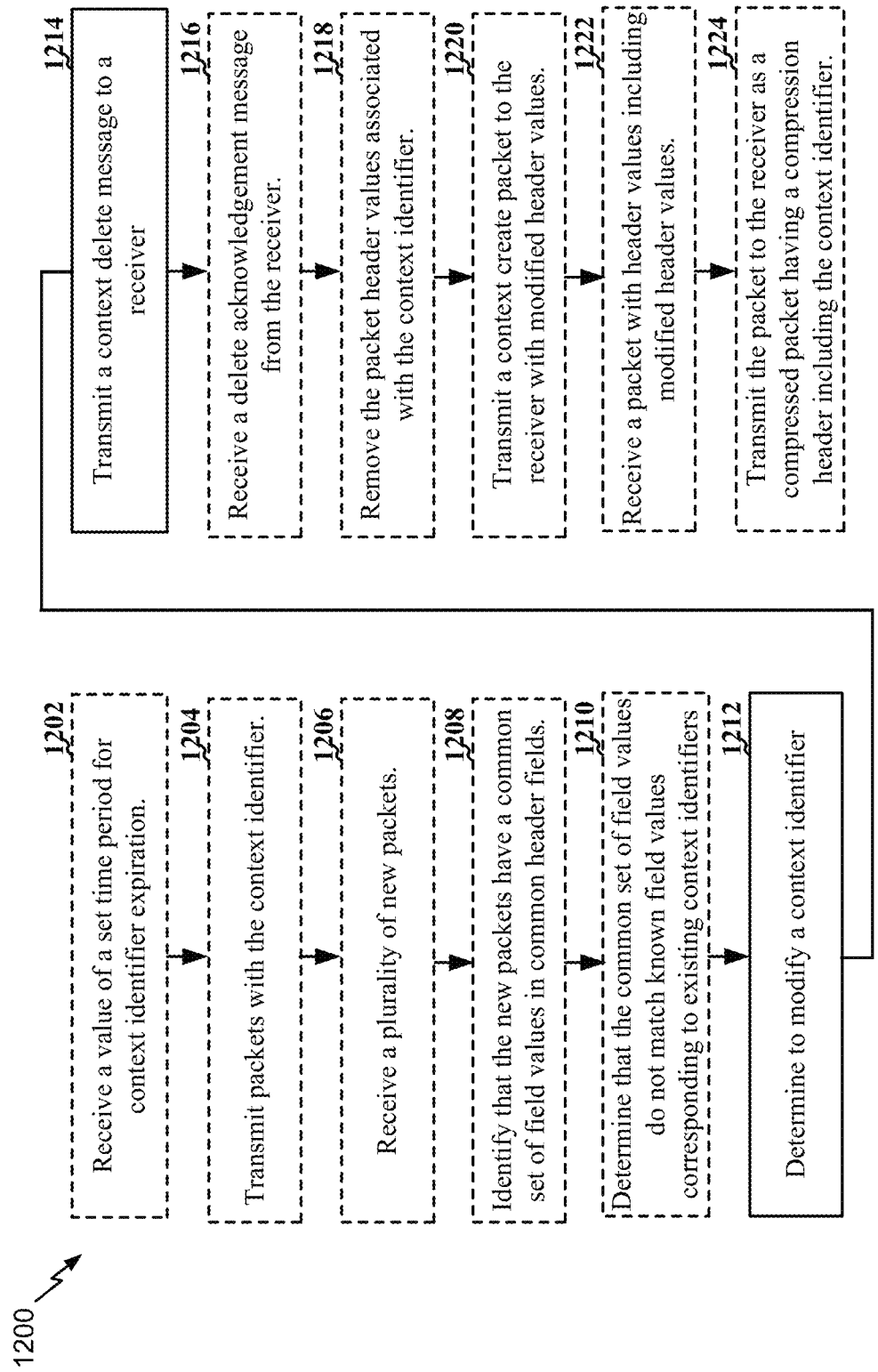

FIG. 12 is a diagram illustrating an example process 1200 performed, for example, by a transmitter, in accordance with various aspects of the present disclosure. Example process 1200 is an example where a transmitter (e.g., transmitter 405, transmitter 505, base station 110, UE 120, network controller 130, and/or the like) performs operations associated with Ethernet header compression in New Radio.

As shown in FIG. 12, in some aspects, process 1200 may include determining to modify a context identifier (block 1212). For example, the transmitter (e.g., using controller/processor 240, controller/processor 280, controller/processor 290, compression component 520, and/or the like) may determine to modify a context identifier, as described above in connection with FIGS. 8-11. The context identifier may correspond to Ethernet packet header values. In some aspects, determining to modify the context identifier may include determining that a set time period has elapsed since the transmitter has transmitted an Ethernet packet with the context identifier to a receiver (e.g., receiver 605, base station 110, UE 120, network controller 130, and/or the like). In some aspects, determining to modify the context identifier may include determining to create a new context identifier, and determining that all available context identifier values are in use. Determining to create the new context identifier may include receiving a plurality new Ethernet packets, identifying that the plurality of new Ethernet packets have a common set of field values in a common set of Ethernet header fields, and determining that the common set of field values in the common set of Ethernet header fields do not match with known field values in known sets of Ethernet header fields corresponding to existing context identifiers. Determining to create the new context identifier may be done in response to determining a lack of the match.

In some aspects, the context identifier corresponds to a profile identifier that identifies a specific set of Ethernet header fields.

As further shown in FIG. 12, in some aspects, process 1200 may include transmitting a context delete message to a receiver identifying the context identifier (block 1214). For example, the transmitter (e.g., using controller/processor 240, controller/processor 280, controller/processor 290, compression component 520, and/or the like) may transmit a context delete message to a receiver (e.g., receiver 605, base station 110, UE 120, network controller 130, and/or the like), as described above in connection with FIGS. 8-11. The context delete message may include a packet data convergence protocol (PDCP) packet data unit (PDU) with a PDCP PDU header value set to control or to data. The PDCP PDU header value may be set to data and the data field of the PDCP PDU may be empty or may include padding bits. The context delete message may include a PDCP PDU packet including an indication to indicate that the context delete message is a context delete message. The indication may be a value of a field in the PDCP PDU.

In some aspects, process 1200 may further include receiving a delete acknowledgement from the receiver (block 1216). For example, the transmitter (e.g., using controller/processor 240, controller/processor 280, controller/processor 290, compression component 520, and/or the like) may receive a delete acknowledgement message from the receiver (e.g., receiver 605, base station 110, UE 120, network controller 130, and/or the like), as described above in connection with FIGS. 8-11. The delete acknowledgement message may include a PDCP PDU with a PDCP PDU header value set to control or to data. The PDCP header value may be set to data and the data field of the PDCP PDU may be empty or may include padding bits. The delete acknowledgement message may include a PDCP PDU including an indication to indicate that the delete acknowledgement message is a delete acknowledgement message. The indication may be a value of a field in the PDCP PDU.

In some aspects, the context delete message includes a PDCP PDU header value set to "control," a PDU type value set to "Ethernet compression," and a subtype value set to "delete," and the delete acknowledgement message includes a PDCP header value set to "control," a PDU type value set to "Ethernet compression," and a subtype value set to "deleteAck."

In some aspects, process 1200 may further include removing the Ethernet packet header values associated with the context identifier (block 1218). The Ethernet packet header values may be removed in response to receiving the delete acknowledgement message. The Ethernet packet header values may be stored in a memory associated with the transmitter, and at block 1218 may be removed from that memory. For example, the transmitter (e.g., using controller/processor 240, controller/processor 280, controller/processor 290, compression component 520, and/or the like) may remove the Ethernet packet header values associated with the context identifier from a memory associated with the transmitter in response to receiving the delete acknowledgement message, as described above in connection with FIGS. 8-11.

In some aspects, process 1200 may further include transmitting a context create packet to the receiver in response to receiving the delete acknowledgement message (block 1220). The context create packet may include modified Ethernet packet header values and the context identifier. For example, the transmitter (e.g., using controller/processor 240, controller/processor 280, controller/processor 290, compression component 520, and/or the like) may transmit a context create packet to the receiver in response to receiving the delete acknowledgement message, the context create packet including modified Ethernet packet header values and the context identifier, as described above in connection with FIGS. 8-11.

In some aspects, process 1200 may further include receiving an Ethernet packet corresponding to the modified Ethernet packet header values (block 1222). The Ethernet packet may have header values corresponding to the modified Ethernet packet header values. For example, the transmitter (e.g., using controller/processor 240, controller/processor 280, controller/processor 290, compression component 520, and/or the like) may receive an Ethernet packet having header values corresponding to the modified Ethernet packet header values, as described above in connection with FIGS. 8-11.

In some aspects, process 1200 may further include transmitting the Ethernet packet to the receiver as a compressed packet (block 1224). The compressed packet may have an Ethernet compression header including the context identifier. For example, the transmitter (e.g., using controller/processor 240, controller/processor 280, controller/processor 290, compression component 520, and/or the like) may transmit the Ethernet packet to the receiver as a compressed packet having an Ethernet compression header including the context identifier, as described above in connection with FIGS. 8-11.

In some aspects, process 1200 may further include transmitting packets with the context identifier (block 1204). That is, at block 1204, the process may include transmitting packets with the context identifier associated with Ethernet header values prior to establishing the new compression context. For example, the transmitter (e.g., using controller/processor 240, controller/processor 280, controller/processor 290, compression component 520, and/or the like) may receive a plurality of Ethernet packets including headers with the Ethernet packet header values, associate the context identifier with the Ethernet packet header values, transmit a first packet of the plurality of packets including the Ethernet packet header values and the context identifier to the receiver, and transmit subsequent ones of the plurality of packets as compressed packets having an Ethernet compression header including the context identifier, as described above in connection with FIGS. 1-11.

In some aspects, process 1200 may further include receiving a plurality of new Ethernet packets (block 1206). For example, the transmitter (e.g., using controller/processor 240, controller/processor 280, controller/processor 290, compression component 520, and/or the like) may receive a plurality of new Ethernet packets, as described above in connection with FIGS. 8-11.

In some aspects, process 1200 may further include identifying that the plurality of new Ethernet packets have a common set of field values in a common set of Ethernet header fields (block 1208). For example, the transmitter (e.g., using controller/processor 240, controller/processor 280, controller/processor 290, compression component 520, and/or the like) may identify that the plurality of new Ethernet packets have a common set of field values in a common set of Ethernet header fields, as described above in connection with FIGS. 8-11.

In some aspects, process 1200 may further include determining that the common set of field values do not match known field values corresponding to existing context identifiers (block 1210). For example, the transmitter (e.g., using controller/processor 240, controller/processor 280, controller/processor 290, compression component 520, and/or the like) may determine that the common set of field values in the common set of Ethernet header fields do not match with known field values in known sets of Ethernet header fields corresponding to existing context identifiers, as described above in connection with FIGS. 8-11. In some aspects, determining to create the new context identifier is in response to determining a lack of the match.

In some aspects, process 1200 may further include receiving a value of the set time period (block 1202). The value of the set time period may be received from a base station (e.g., receiver 605, base station 110, UE 120, network controller 130, and/or the like). For example, the transmitter (e.g., using controller/processor 240, controller/processor 280, controller/processor 290, compression component 520, and/or the like) may receive a value of the set time period from a base station, as described above in connection with FIGS. 8-11.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
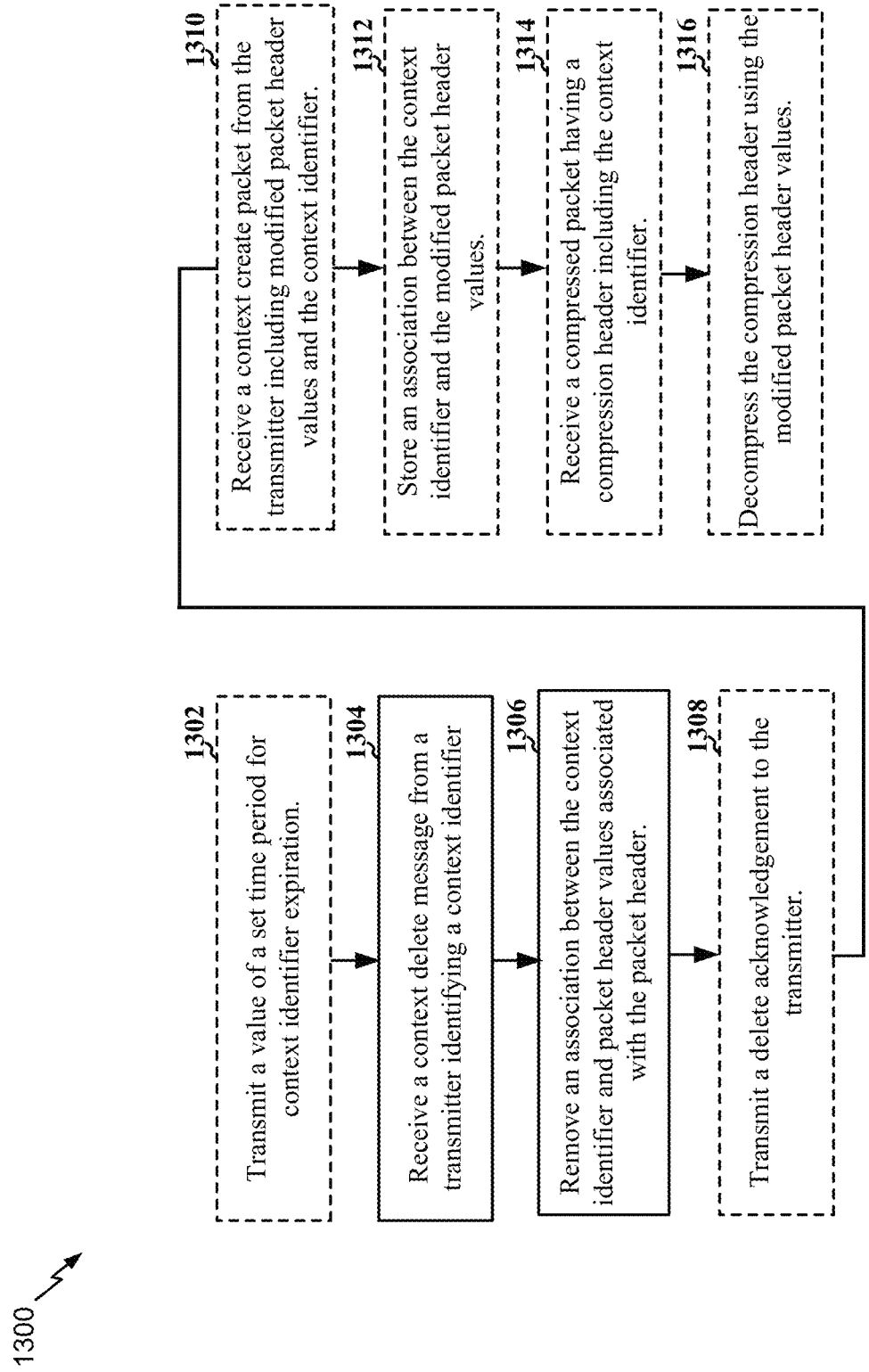

FIG. 13 is a diagram illustrating an example process 1300 performed, for example, by a receiver, in accordance with various aspects of the present disclosure for managing Ethernet header compression states, as described herein. Example process 1300 is an example where a receiver (e.g., receiver 605, base station 110, UE 120, network controller 130, and/or the like) performs operations associated with Ethernet header compression and decompression in New Radio.

As shown in FIG. 13, in some aspects, process 1300 may include receiving a context delete message from a transmitter, the context delete message identifying a context identifier (block 1304). For example, the receiver (e.g., receiver 605, base station 110, UE 120, network controller 130, and/or the like) may receiving a context delete message from a transmitter (e.g., transmitter 405, transmitter 505, base station 110, UE 120, network controller 130, and/or the like), the context delete message identifying a context identifier corresponding to Ethernet packet header values, as described above in connection with FIGS. 8-11. The context delete message may include a packet data convergence protocol (PDCP) packet data unit (PDU) with a PDCP PDU header value set to control or to data. The context delete message may include a PDCP PDU packet including an indication to indicate that the context delete message is a context delete message. The indication may be a value of a field in the PDCP PDU.

In some aspects, the PDCP PDU header value of the context delete message is set to data, a data field of the PDCP PDU of the context delete message is empty or includes padding bits, and the receiver ignores the data field of the PDCP PDU of the context delete message.

As further shown in FIG. 13, in some aspects, process 1300 may include removing an association between the context identifier and the Ethernet packet header values (block 1306). The association may be removed in response to receiving the context delete message. For example, the receiver (e.g., receiver 605, base station 110, UE 120, network controller 130, and/or the like) may remove an association between the context identifier and the Ethernet packet header values in response to receiving the context delete message, as described above in connection with FIGS. 8-11. Removing an association between the context identifier and the Ethernet packet header values may be removing the Ethernet packet header values from a memory associated with the receiver.

In some aspects, process 1300 may further include transmitting a delete acknowledgement message to the transmitter (block 1308). For example, the receiver (e.g., receiver 605, base station 110, UE 120, network controller 130, and/or the like) may transmit a delete acknowledgement message to the transmitter (e.g., transmitter 405, transmitter 505, base station 110, UE 120, network controller 130, and/or the like), as described above in connection with FIGS. 8-11. The delete acknowledgement message may include a PDCP PDU with a PDCP PDU header value set to control or to data. The delete acknowledgement message may include a PDCP PDU including an indication to indicate that the delete acknowledgement message is a delete acknowledgement message. The indication may be a value of a field in the PDCP PDU.

In some aspects, the PDCP header value of the delete acknowledgement message is set to data, a data field of the PDCP PDU of the delete acknowledgement message is empty or includes padding bits, and the receiver ignores the data field of the PDCP PDU of the delete acknowledgement message.

In some aspects, the context delete message includes a PDCP PDU header value set to "control," a PDU type value set to "Ethernet compression," and a subtype value set to "delete," and the delete acknowledgement message includes a PDCP header value set to "control," a PDU type value set to "Ethernet compression," and a subtype value set to "deleteAck."

In some aspects, process 1300 may further include receiving a context create packet from the transmitter (block 1310). The context create packet may include modified Ethernet packet header values and the context identifier. For example, the receiver (e.g., receiver 605, base station 110, UE 120, network controller 130, and/or the like) may receive a context create packet from the transmitter (e.g., transmitter 405, transmitter 505, base station 110, UE 120, network controller 130, and/or the like), the context create packet including modified Ethernet packet header values and the context identifier, as described above in connection with FIGS. 8-11.

In some aspects, process 1300 may further include storing an association between the context identifier and the modified Ethernet packet header values (block 1312). For example, the receiver (e.g., receiver 605, base station 110, UE 120, network controller 130, and/or the like) may store an association between the context identifier and the modified Ethernet packet header values, as described above in connection with FIGS. 8-11.

In some aspects, process 1300 may further include receiving a compressed packet having an Ethernet compression header (block 1314). The Ethernet compression header may include the context identifier For example, the receiver (e.g., receiver 605, base station 110, UE 120, network controller 130, and/or the like) may receive a compressed packet having an Ethernet compression header including the context identifier, as described above in connection with FIGS. 8-11.

In some aspects, process 1300 may further include decompressing the Ethernet compression header using the modified Ethernet packet header values (block 1316). For example, the receiver (e.g., receiver 605, base station 110, UE 120, network controller 130, and/or the like) may decompress the Ethernet compression header using the modified Ethernet packet header values, as described above in connection with FIGS. 8-11.

In some optional aspects, process 1300 may further include transmitting a value of a set time period to the transmitter (block 1302). The transmitter may determine to modify the context identifier based on the set time period. For example, the receiver (e.g., receiver 605, base station 110, UE 120, network controller 130, and/or the like) may transmit a value of a set time period to the transmitter (e.g., transmitter 405, transmitter 505, base station 110, UE 120, network controller 130, and/or the like), and the transmitter may determine to modify the context identifier based on the set time period, as described above in connection with FIGS. 8-11.

Figure 14:
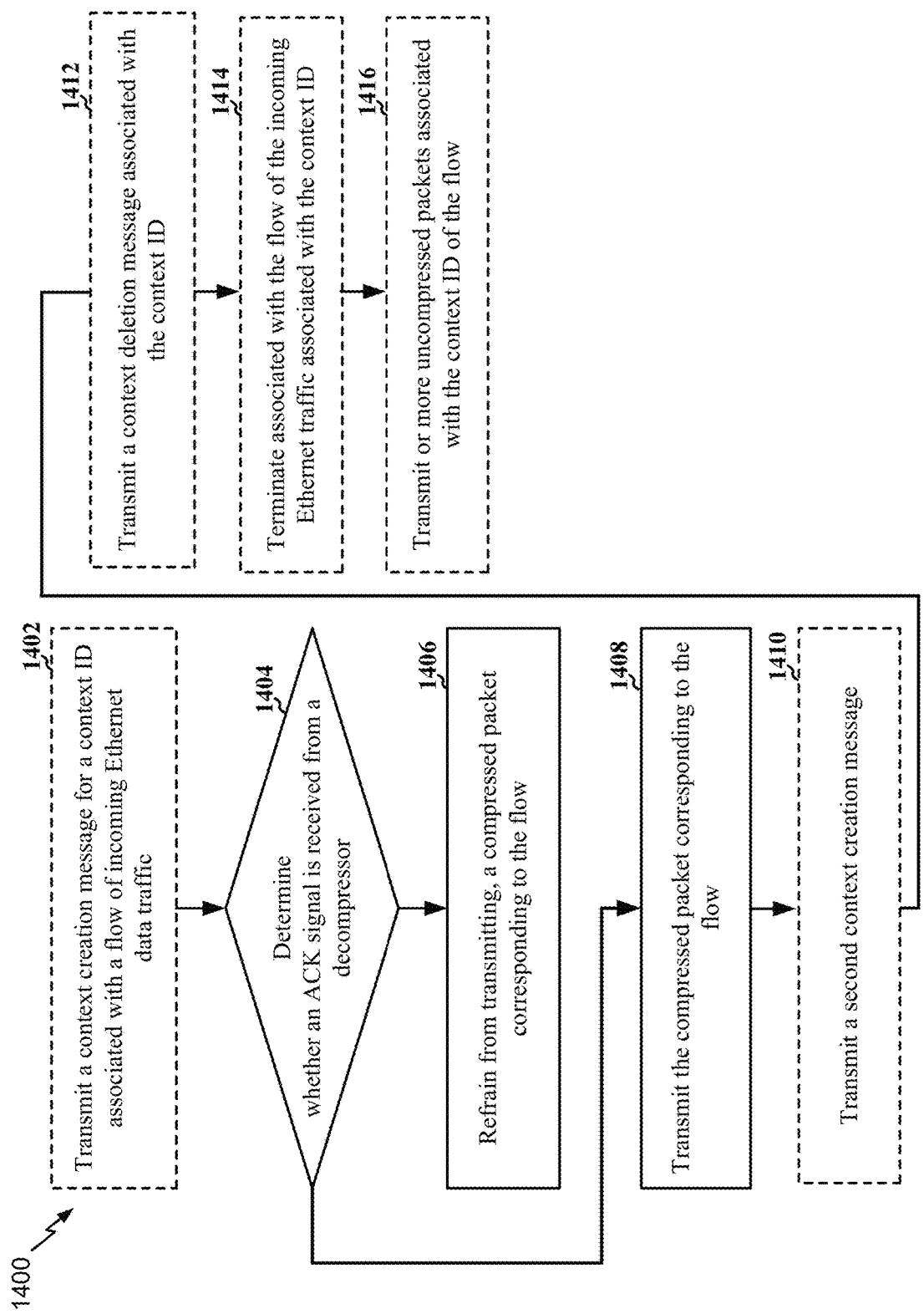

FIG. 14 is a diagram illustrating an example process 1400 performed, for example, by a transmitter and/or compressor, in accordance with various aspects of Ethernet header compression context creation and/or context deletion operations, as described in the present disclosure. Example process 1400 is an example where a transmitter (e.g., transmitter 405, transmitter 505, base station 110, UE 120, network controller 130, and/or the like) performs operations associated with Ethernet header compression in New Radio.

As shown in FIG. 14, in some aspects, process 1400 may include transmitting, over a wireless communication link, a context creation message for a context identification (ID) associated with a flow of incoming Ethernet data traffic (block 1402). The context creation message may be transmitted to a base station (e.g., receiver 605, base station 110, UE 120, network controller 130, and/or the like). For example, the transmitter (e.g., using controller/processor 240, controller/processor 280, controller/processor 290, compression component 520, and/or the like) may identify Ethernet data packets in a flow having common header portions, and create a context for the common portions. Further, the transmitter (e.g., using controller/processor 240, controller/processor 280, controller/processor 290, compression component 520, and/or the like) may transform data representing the context creation message and context identifier into a signal and, via one or more antennas (e.g., antennas 234a through 234t, or 252a through 252r) transmit, over a wireless communication link, the context creation message for a context ID associated with a flow of incoming Ethernet data traffic, as described above in connection with FIGS. 8-13.

In some aspects, process 1400 may include determining, at a compressor, whether an acknowledgement (ACK) signal is received from a decompressor in response to transmitting, over a wireless communication link, a context creation message for a context ID associated with a flow of incoming Ethernet data traffic (block 1404). For example, the transmitter (e.g., using controller/processor 240, controller/processor 280, controller/processor 290, compression component 520, and/or the like) may determine whether an ACK signal is received from a decompressor, as described above in connection with FIGS. 8-13. Further, the transmitter (e.g., using controller/processor 240, controller/processor 280, controller/processor 290, compression component 520, and/or the like) may receive a signal after the context creation message is transmitted which corresponds to an ACK signal indicating that the network node associated with the decompressor successfully received the context creation message.

In some aspects, determining whether the ACK signal is received from the decompressor further comprises determining whether the ACK signal is received from the decompressor within a context-create-time threshold of the transmitting of the context creating message. For example, in one implementation, the context-create-time threshold corresponds to a duration of time (e.g., a maximum time) between context creation packets that will be accepted and acted upon by the decompressor. In an example, the context-create-time threshold may be configured at the compressor by a network node. As such, the compressor may receive the context-create-time threshold from a network node, which may be associated with the decompressor,. Thus, by causing the compressor to check for receipt of the ACK from the decompressor for an amount of time corresponding to the context-create-time threshold, the present disclosure provides a configurable amount of time that the compressor must wait before creating or changing a context, and allows the decompressor time to configure the new or changed context, thereby controlling a frequency of context changes. In some aspects, the context-create-time threshold prevents unnecessary processing and/or transmissions of compressed packets by configuring the compressor to wait a period of time before making a determination regarding whether to continue compressing packets. Additionally, the context-create-time threshold prevents the compressor from unnecessarily waiting too long before making a determination regarding compressing packets.

In an example, a value of the context-create-time threshold may be based on a retransmission window for each of a plurality of context creation messages. Additionally, the plurality of context creation messages may be based on hybrid access repeat request (HARQ) transmissions and radio link control (RLC) retransmissions used by a network entity.

As further shown in FIG. 14, in some aspects, process 1400 may include refraining from transmitting, by the compressor to the decompressor over the wireless communication link, a compressed packet corresponding to the flow based on a first determination that the ACK signal is not received from the decompressor (block 1406). For example, the transmitter (e.g., using controller/processor 240, controller/processor 280, controller/processor 290, compression component 520, and/or the like) may refrain from transmitting, by the compressor to the decompressor over the wireless communication link, a compressed packet corresponding to the flow based on a first determination that the ACK signal is not received from the decompressor, as described above in connection with FIGS. 8-13. In some aspects, the transmitter (e.g., using controller/processor 240, controller/processor 280, controller/processor 290, compression component 520, and/or the like) may be configured to wait a minimum amount of time before transmitting the compressed packet based on the minimum context-create-time threshold. Additionally, the transmitter may also wait until the maximum context-create-time threshold expires before resuming transmissions if an ACK signal from the network node associated with the decompressor is not received.

In some aspects, the context-create-time threshold and process 1400 prevents unnecessary compression procedures from being performed and transmissions of compressed packets from occurring by introducing context-create-time threshold for receiving the ACK signal from the network node associated with the decompressor before the compressor makes a decision. Accordingly, the compressor and the decompressor can remain in synchronization and prevent packet content mismatches, retransmissions, and other errors from occurring.

In some aspects, process 1400 may further include transmitting, by the compressor to the decompressor over the wireless communication link, the compressed packet corresponding to the flow based on a second determination that the ACK signal is received from the decompressor (block 1408). For example, the transmitter (e.g., using controller/processor 240, controller/processor 280, controller/processor 290, compression component 520, and/or the like) may transmit, by the compressor to the decompressor over the wireless communication link, the compressed packet corresponding to the flow based on a second determination that the ACK signal is received from the decompressor, as described above in connection with FIGS. 8-13.

In some aspects, the compressor (e.g., the compression component 520) may compress the packet by determining that an Ethernet header of the filtered Ethernet traffic is fully specified by a traffic flow template stored by the TFT component 510. The Ethernet header may be fully specified by a traffic flow template when the traffic flow template includes a specific value (e.g., and not a range of values) for all required fields of the Ethernet header, and each of those specific values match a corresponding value for a corresponding field included in the Ethernet header (e.g., of incoming Ethernet traffic).

In some aspects, process 1400 may further include transmitting, by the compressor to the decompressor, a second context creation message based on the second determination that the ACK signal is not received from the decompressor within a context-create-time threshold of the transmitting of the context creating message (block 1410). For example, the transmitter (e.g., using controller/processor 240, controller/processor 280, controller/processor 290, compression component 520, and/or the like) may transmit, by the compressor to the decompressor, a second context creation message based on the second determination that the ACK signal is not received from the decompressor within a context-create-time threshold of the transmitting of the context creating message, as described above in connection with FIGS. 8-13. This allows the compressor to try another context creation if the previous one was not acknowledged by the decompressor, after waiting the configured amount of time.

In some aspects, the transmitter may send the second context creation message any time after the context-create-time threshold. In other cases, the context-create-time threshold includes a minimum context-create-time threshold and a maximum context-create-time threshold, which may define a window of time associated with signaling the context creation message. For example, in this case, in order for a valid context creation to occur, the transmitter may be configured to transmit the second context create message after the context-create-time minimum threshold expires and before the context-create-time minimum threshold expires.

In some aspects, process 1400 may further include transmitting, by the compressor to the decompressor, a context deletion message associated with the context ID (block 1412). For example, the transmitter (e.g., using controller/processor 240, controller/processor 280, controller/processor 290, compression component 520, and/or the like) may transmit, by the compressor to the decompressor, a context deletion message associated with the context ID, as described above in connection with FIGS. 8-13. Further, the transmitter (e.g., using controller/processor 240, controller/processor 280, controller/processor 290, compression component 520, and/or the like) may transform data representing the context deletion message a signal and, via one or more antennas (e.g., antennas 234a through 234t, or 252a through 252r) transmit, over a wireless communication link, the signal.

In some aspects, process 1400 may further include terminating, by the compressor, compression associated with the flow of the incoming Ethernet traffic associated with the context ID upon transmission of the context deletion message (block 1414). For example, the transmitter (e.g., using controller/processor 240, controller/processor 280, controller/processor 290, compression component 520, and/or the like) may terminate, by the compressor, compression associated with the flow of the incoming Ethernet traffic associated with the context ID upon transmission of the context deletion message, as described above in connection with FIGS. 8-13. In an example, the compressor (e.g., the compression component 520) may receive a signal/indication from the transmitter (e.g., using controller/processor 240, controller/processor 280, controller/processor 290) that the context deletion message was transmitted and to cease compression associated with the flow of the incoming Ethernet traffic associated with the context ID.

In some aspects, process 1400 may further include transmitting, by the compressor, one or more uncompressed packets associated with the context ID of the flow in response to transmitting the context deletion message (block 1416). For example, the transmitter (e.g., using controller/processor 240, controller/processor 280, controller/processor 290, compression component 520, and/or the like) may transmit, by the compressor, one or more uncompressed packets associated with the context ID of the flow in response to transmitting the context deletion message, as described above in connection with FIGS. 8-13. In an example, the compressor (e.g., the compression component 520) may receive a signal/indication from the transmitter (e.g., using controller/processor 240, controller/processor 280, controller/processor 290) that the context deletion message was transmitted and to cease compression associated with the flow of the incoming Ethernet traffic associated with the context ID. Accordingly, the transmitter (e.g., using controller/processor 240, controller/processor 280, controller/processor 290) may then transmit uncompressed packets by transforming data representing the uncompressed packets into a signal and, via one or more antennas (e.g., antennas 234a through 234t, or 252a through 252r) transmit, over a wireless communication link, the signal.

In some aspects, process 1400 may further include determining, by the compressor, whether a second ACK signal is received from the decompressor in response to transmitting the context deletion message; and transmitting, by the compressor to the decompressor, a second context deletion message based on a determination that the second ACK is not received from the decompressor. For example, determining whether the second ACK signal is received from the decompressor further comprises determining whether the second ACK signal is received from the decompressor within a context-delete-time threshold. In a further example, the compressor may receive from the decompressor, the context-delete-time threshold.

Thus, in summary, the operations of the compressor may include utilizing a context creation packet. For example, until an ACK signal is received from the decompressor, the compressor will continue to transmit uncompressed packets. Further, if no ACK signal is received by the compressor, after expiration of a context-create-time threshold then the compressor may be configured to retransmit the context creation packet. Additionally, the compressor is configured to transmit a context delete message from which afterwards the compressor will transmit uncompressed packets. However, until an ACK signal associated with the context delete message is received, the compressor will not reuse the same context ID.

Figure 15:
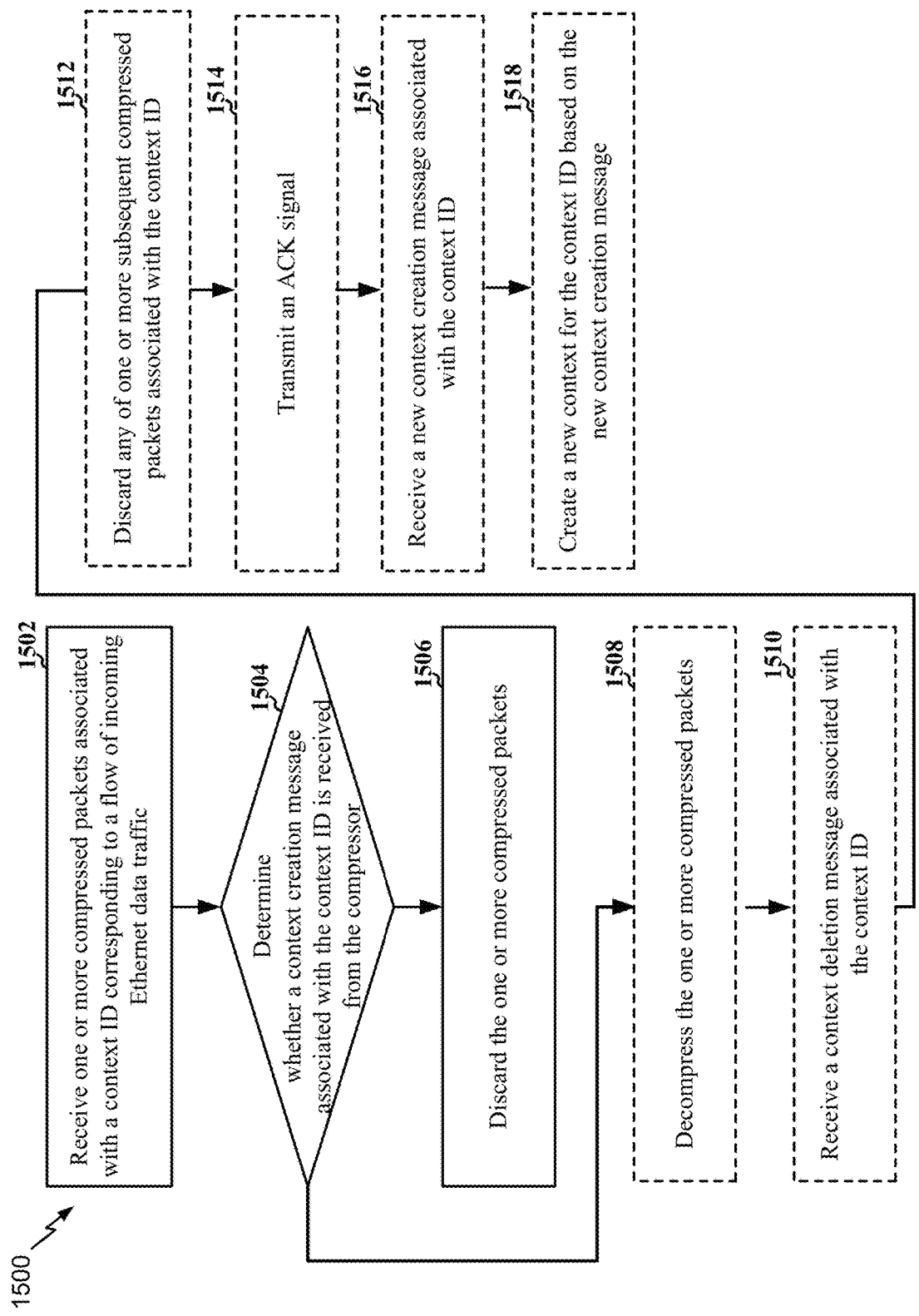

FIG. 15 is a diagram illustrating an example process 1500 performed, for example, by a receiver, in accordance with various aspects of the present disclosure. Example process 1500 is an example where a receiver (e.g., receiver 605, base station 110, UE 120, network controller 130, and/or the like) performs operations associated with Ethernet header compression and decompression in New Radio.

As shown in FIG. 1500, in some aspects, process 1500 may include receiving, by a decompressor from a compressor and over a wireless communication link, one or more compressed packets associated with a context identification (ID) corresponding to a flow of incoming Ethernet data traffic (block 1502). For example, the receiver (e.g., receiver 605, base station 110, UE 120, network controller 130, and/or the like) may receive, by a decompressor from a compressor and over a wireless communication link, one or more compressed packets associated with a context identification (ID) corresponding to a flow of incoming Ethernet data traffic, as described above in connection with FIGS. 8-13. Further, the receiver (e.g., receiver 605, base station 110, UE 120, network controller 130, and/or the like) may transform the signal into data representing the one or more compressed packets associated with a context ID.

In some aspects, process 1500 may include determining, by a decompressor, whether a context creation message associated with the context ID is received from the compressor (block 1504). For example, the receiver (e.g., receiver 605, base station 110, UE 120, network controller 130, and/or the like) may determine, by a decompressor, whether a context creation message associated with the context ID is received from the compressor, as described above in connection with FIGS. 8-13.

In some aspects, determining whether the context creation message associated with the context ID is received from the compressor further comprises determining whether the context creation message was received before reception of the one or more compressed packets.

For example, the receiver (e.g., receiver 605, base station 110, UE 120, network controller 130, and/or the like) may be configured for buffering, by the decompressor, the one or more compressed packets for a period of time based on a determination that the context creation message was received before reception of the one or more compressed packets; determining, by the decompressor, whether the context creation message associated with the context ID is received from the compressor before expiration of the period of time; and decompressing, by the decompressor, the one or more compressed packets based on a determination that the context creation message associated with the context ID is received from the compressor before expiration of the period of time. Further, the receiver (e.g., receiver 605, base station 110, UE 120, network controller 130, and/or the like) may store the one or more compressed packets into a memory 292 until the expiration of the period of time.

In a further example, the receiver (e.g., receiver 605, base station 110, UE 120, network controller 130, and/or the like) may be configured for discarding, by the decompressor, the one or more compressed packets based on a determination that the context creation message associated with the context ID is not received from the compressor before expiration of the period of time.

In some aspects, process 1500 may include discarding, by the decompressor, the one or more compressed packets based on a determination that the context creation message associated with the context ID is not received from the compressor (block 1506). For example, the receiver (e.g., receiver 605, base station 110, UE 120, network controller 130, and/or the like) may discard, by the decompressor, the one or more compressed packets based on a determination that the context creation message associated with the context ID is not received from the compressor, as described above in connection with FIGS. 8-13. Further, the receiver (e.g., receiver 605, base station 110, UE 120, network controller 130, and/or the like) may delete the one or more compressed packets from the memory 292.

In some aspects, process 1500 may include decompressing, by the decompressor, the one or more compressed packets based on a determination that the context creation message associated with the context ID is received from the compressor (block 1508). For example, the receiver (e.g., receiver 605, base station 110, UE 120, network controller 130, and/or the like) may decompress, by the decompressor, the one or more compressed packets based on a determination that the context creation message associated with the context ID is received from the compressor, as described above in connection with FIGS. 8-13. Further, the decompressor (e.g., header reconstruction component 615) or receiver (e.g., receiver 605) may need to be prepared for any incoming packet to replace an existing compression context, in which case it may need to deliver this packet to higher layers within the tight URLLC deadlines, as well as execute context modification procedures.

In some aspects, process 1500 may include receiving, by the decompressor from the compressor, a context deletion message associated with the context ID (block 1510). For example, the receiver (e.g., receiver 605, base station 110, UE 120, network controller 130, and/or the like) may receive, by the decompressor from the compressor, a context deletion message associated with the context ID, as described above in connection with FIGS. 8-13.

In some aspects, process 1500 may include discarding, by the decompressor, any of one or more subsequent compressed packets associated with the context ID in response to receiving the context deletion message (block 1512). For example, the receiver (e.g., receiver 605, base station 110, UE 120, network controller 130, and/or the like) may discard, by the decompressor, any of one or more subsequent compressed packets associated with the context ID in response to receiving the context deletion message, as described above in connection with FIGS. 8-13.

In some aspects, process 1500 may include transmitting an acknowledgement (ACK) signal in response to receiving the context deletion message (block 1514). For example, the receiver (e.g., receiver 605, base station 110, UE 120, network controller 130, and/or the like) may transmit an acknowledgement (ACK) signal in response to receiving the context deletion message, as described above in connection with FIGS. 8-13. Further, the receiver (e.g., receiver 605, base station 110, UE 120, network controller 130, and/or the like) may transform data representing the ACK signal into a signal and, via one or more antennas (e.g., antennas 234a through 234t, or 252a through 252r) transmit, over a wireless communication link, the ACK signal to the compressor.

In some aspects, process 1500 may include receiving a new context creation message associated with the context ID (block 1516). For example, the receiver (e.g., receiver 605, base station 110, UE 120, network controller 130, and/or the like) may receive a new context creation message associated with the context ID, as described above in connection with FIGS. 8-13. Further, the receiver (e.g., receiver 605, base station 110, UE 120, network controller 130, and/or the like) may transform the signal into data representing the new context creation message.

In some aspects, process 1500 may include creating a new context for the context ID based on the new context creation message in response to transmitting the ACK signal and receiving the new context creation message (block 1518). For example, the receiver (e.g., receiver 605, base station 110, UE 120, network controller 130, and/or the like) may create a new context for the context ID based on the new context creation message in response to transmitting the ACK signal and receiving the new context creation message, as described above in connection with FIGS. 8-13. In some aspects, the receiver (e.g., receiver 605, base station 110, UE 120, network controller 130, and/or the like) may ignore packets associated with the current context ID or the same context ID requests. Accordingly, the new context allows the receiver (e.g., receiver 605, base station 110, UE 120, network controller 130, and/or the like) to decompress any received compressed packets.

Thus, in summary, the decompressor is configured to expect receiving uncompressed packets until the decompressor receives a context creation message. For example, after receiving the context creation message, the decompressor is configured to transmit an ACK signal. Upon transmission of the ACK signal, the decompressor expects either compressed and/or uncompressed packets. Further, the decompressor may ignore the same context ID context request until a context delete message is processed. Additionally, after a context delete ACK signal is transmitted, the context creation message with the same context ID is acceptable by the decompressor.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method at a device configured to process both wireless data traffic and Ethernet data traffic into a wireless communication, comprising:
   determining, at a compressor, whether an acknowledgement (ACK) signal is received from a decompressor in response to transmitting, over a wireless communication link, a context creation message for a context identification (ID) associated with a first flow of incoming Ethernet data traffic, wherein the context creation message includes a packet data convergence protocol (PDCP) packet data unit (PDU) header value, a PDCP PDU type value, context identifier value, and subtype value associated with the context identifier value;
   refraining from transmitting, by the compressor to the decompressor over the wireless communication link, a compressed packet corresponding to the first flow based on a first determination that the ACK signal is not received from the decompressor;
   transmitting, by the compressor to the decompressor, a second context creation message based on a second determination that the ACK signal is not received from the decompressor within a context-create-time threshold of the transmitting of the context creating message;
   transmitting, by the compressor to the decompressor over the wireless communication link, the compressed packet corresponding to the first flow based on a third determination that a subsequent ACK signal is received from the decompressor in response to transmitting the second context creation message;
   determining, at the compressor, whether the first flow associated with the context ID is not receiving any traffic; and updating, in response to determining the first flow is not receiving any traffic, an association of the context ID from the first flow to a second flow of incoming Ethernet data traffic, wherein the second flow differs from the first flow.

2. The method of claim 1, wherein determining whether the ACK signal is received from the decompressor further comprises determining whether the ACK signal is received from the decompressor within a context-create-time threshold of the transmitting of the context creating message.

3. The method of claim 2, wherein the context-create-time threshold corresponds to a maximum duration of time between context creation packets.

4. The method of claim 2, further comprising receiving, at the compressor from a network node associated with the decompressor, the context-create-time threshold.

5. The method of claim 4, wherein the context-create-time threshold is based on a retransmission window for each of a plurality of context creation messages.

6. The method of claim 5, wherein the plurality of context creation messages are based on hybrid access repeat request (HARQ) transmissions and radio link control (RLC) retransmissions used by a network entity.

7. The method of claim 2, wherein the context-create-time threshold includes a minimum context-create-time threshold and a maximum context-create-time threshold.

8. The method of claim 7, wherein transmitting the second context creation message comprises transmitting after the context-create-time minimum threshold and before the context-create-time minimum threshold expires.

9. The method of claim 1, further comprising:
transmitting, by the compressor to the decompressor, a context deletion message associated with the context ID;
terminating, by the compressor, compression associated with the first flow of the incoming Ethernet traffic associated with the context ID upon transmission of the context deletion message; and
transmitting, by the compressor, one or more uncompressed packets associated with the context ID of the first flow in response to transmitting the context deletion message.

10. The method of claim 9, further comprising:
determining, by the compressor, whether a second ACK signal is received from the decompressor in response to transmitting the context deletion message; and
transmitting, by the compressor to the decompressor, a second context deletion message based on a determination that the second ACK is not received from the decompressor.

11. The method of claim 10, wherein determining whether the second ACK signal is received from the decompressor further comprises determining whether the second ACK signal is received from the decompressor within a context-delete-time threshold.

12. The method of claim 11, further comprising receiving, at the compressor from the decompressor, the context-delete-time threshold.

13. An apparatus configured to process both wireless data traffic and Ethernet data traffic into a wireless communication, comprising:
a memory; and
a processor in communication with the memory, wherein the processor is configured to:
determine, at a compressor, whether an acknowledgement (ACK) signal is received from a decompressor in response to transmitting, over a wireless communication link, a context creation message for a context identification (ID) associated with a first flow of incoming Ethernet data traffic, wherein the context creation message includes a packet data convergence protocol (PDCP) packet data unit (PDU) header value, a PDCP PDU type value, context identifier value, and subtype value associated with the context identifier value;
refrain from transmitting, by the compressor to the decompressor over the wireless communication link, a compressed packet corresponding to the first flow based on a first determination that the ACK signal is not received from the decompressor;
transmit, by the compressor to the decompressor, a second context creation message based on a second determination that the ACK signal is not received from the decompressor within a context-create-time threshold of the transmitting of the context creating message;
transmit, by the compressor to the decompressor over the wireless communication link, the compressed packet corresponding to the first flow based on a third determination that a subsequent ACK signal is received from the decompressor in response to transmitting the second context creation message;
determine, at the compressor, whether the first flow associated with the context ID is not receiving any traffic; and
update, in response to determining the first flow is not receiving any traffic, an association of the context ID from the first flow to a second flow of incoming Ethernet data traffic, wherein the second flow differs from the first flow.

14. The apparatus of claim 13, wherein the processor configured to determine whether the ACK signal is received from the decompressor is further configured to determine whether the ACK signal is received from the decompressor within a context-create-time threshold of the transmitting of the context creating message.

15. The apparatus of claim 14, wherein the context-create-time threshold corresponds to a maximum duration of time between context creation packets.

16. The apparatus of claim 14, wherein the processor is further configured to receive, at the compressor from a network node associated with the decompressor, the context-create-time threshold.

17. The apparatus of claim 16, wherein the context-create-time threshold is based on a retransmission window for each of a plurality of context creation messages.

18. The apparatus of claim 17, wherein the plurality of context creation messages are based on hybrid access repeat request (HARQ) transmissions and radio link control (RLC) retransmissions used by a network entity.

19. The apparatus of claim 14, wherein the context-create-time threshold includes a minimum context-create-time threshold and a maximum context-create-time threshold.

20. The apparatus of claim 19, wherein the processor configured to transmit the second context creation message is further configured to transmit after the context-create-time minimum threshold and before the context-create-time minimum threshold expires.

21. The apparatus of claim 13, wherein the processor is further configured to:
transmit, by the compressor to the decompressor, a context deletion message associated with the context ID;
terminate, by the compressor, compression associated with the first flow of the incoming Ethernet traffic associated with the context ID upon transmission of the context deletion message; and transmit, by the compressor, one or more uncompressed packets associated with the context ID of the first flow in response to transmitting the context deletion message.

22. The apparatus of claim 21, wherein the processor is further configured to:

determine, by the compressor, whether a second ACK signal is received from the decompressor in response to transmitting the context deletion message; and transmit, by the compressor to the decompressor, a second context deletion message based on a determination that the second ACK is not received from the decompressor.

23. The apparatus of claim 22, wherein the processor configured to determine whether the second ACK signal is received from the decompressor is further configured to determine whether the second ACK signal is received from the decompressor within a context-delete-time threshold.

24. The apparatus of claim 23, wherein the processor is configured to receive, at the compressor from the decompressor, the context-delete-time threshold.

25. An apparatus configured to process both wireless data traffic and Ethernet data traffic into a wireless communication, comprising:

means for determining, at a compressor, whether an acknowledgement (ACK) signal is received from a decompressor in response to transmitting, over a wireless communication link, a context creation message for a context identification (ID) associated with a first flow of incoming Ethernet data traffic, wherein the context creation message includes a packet data convergence protocol (PDCP) packet data unit (PDU) header value, a PDCP PDU type value, context identifier value, and subtype value associated with the context identifier value;

means for refraining from transmitting, by the compressor to the decompressor over the wireless communication link, a compressed packet corresponding to the first flow based on a first determination that the ACK signal is not received from the decompressor; and means for transmitting, by the compressor to the decompressor, a second context creation message based on a second determination that the ACK signal is not received from the decompressor within a context-create-time threshold of the transmitting of the context creating message;

means for transmitting, by the compressor to the decompressor over the wireless communication link, the compressed packet corresponding to the first flow based on a third determination that a subsequent ACK signal is received from the decompressor in response to transmitting the second context creation message;

means for determining, at the compressor, whether the first flow associated with the context ID is not receiving any traffic; and means for updating, in response to determining the first flow is not receiving any traffic, an association of the context ID from the first flow to a second flow of incoming Ethernet data traffic, wherein the second flow differs from the first flow.

26. The apparatus of claim 25, wherein the means for determining whether the ACK signal is received from the decompressor further comprises means for determining whether the ACK signal is received from the decompressor within a context-create-time threshold of the transmitting of the context creating message.

27. A non-transitory computer-readable medium storing instructions executable by a processor and configured to process both wireless data traffic and Ethernet data traffic into a wireless communication, comprising:

code for determining, at a compressor, whether an acknowledgement (ACK) signal is received from a decompressor in response to transmitting, over a wireless communication link, a context creation message for a context identification (ID) associated with a first flow of incoming Ethernet data traffic, wherein the context creation message includes a packet data convergence protocol (PDCP) packet data unit (PDU) header value, a PDCP PDU type value, context identifier value, and subtype value associated with the context identifier value;

code for refraining from transmitting, by the compressor to the decompressor over the wireless communication link, a compressed packet corresponding to the first flow based on a first determination that the ACK signal is not received from the decompressor; and code for transmitting, by the compressor to the decompressor, a second context creation message based on a second determination that the ACK signal is not received from the decompressor within a context-create-time threshold of the transmitting of the context creating message;

code for transmitting, by the compressor to the decompressor over the wireless communication link, the compressed packet corresponding to the first flow based on a third determination that a subsequent ACK signal is received from the decompressor in response to transmitting the second context creation message;

code for determining, at the compressor, whether the first flow associated with the context ID is not receiving any traffic; and code for updating, in response to determining the first flow is not receiving any traffic, an association of the context ID from the first flow to a second flow of incoming Ethernet data traffic, wherein the second flow differs from the first flow.

28. The computer-readable medium of claim 27, wherein the code for determining whether the ACK signal is received from the decompressor further comprises code for determining whether the ACK signal is received from the decompressor within a context-create-time threshold of the transmitting of the context creating message.

* * * * *